United States Patent [19]
Joffe

[11] Patent Number: 5,910,928
[45] Date of Patent: Jun. 8, 1999

[54] MEMORY INTERFACE UNIT, SHARED MEMORY SWITCH SYSTEM AND ASSOCIATED METHOD

[75] Inventor: Alexander Joffe, Palo Alto, Calif.

[73] Assignee: MMC Networks, Inc., Santa Clara, Calif.

[21] Appl. No.: 08/998,586

[22] Filed: Dec. 29, 1997

Related U.S. Application Data

[63] Continuation of application No. 08/512,613, Aug. 7, 1995, Pat. No. 5,732,041, which is a continuation-in-part of application No. 08/109,805, Aug. 19, 1993, Pat. No. 5,440,523.

[51] Int. Cl.$^6$ .................................................. G11C 11/401
[52] U.S. Cl. .............................. 365/230.05; 365/230.08; 365/231; 365/189.05
[58] Field of Search ...................... 365/230.01, 230.05, 365/230.08, 231, 189.04

[56] References Cited

U.S. PATENT DOCUMENTS

| | | | |
|---|---|---|---|
| 4,744,078 | 5/1988 | Kowalczyk . | |
| 4,750,154 | 6/1988 | Lefsky et al. . | |
| 4,754,451 | 6/1988 | Eng et al. . | |
| 4,760,570 | 7/1988 | Acampora et al. . | |
| 4,888,741 | 12/1989 | Malinowski | 365/230.05 |
| 4,891,794 | 1/1990 | Hush et al. | 365/230.05 |
| 4,891,795 | 1/1990 | Pinkham et al. . | |
| 5,142,638 | 8/1992 | Schiffleger . | |
| 5,204,841 | 4/1993 | Chappell et al. | 365/230.05 |
| 5,278,967 | 1/1994 | Curran | 395/425 |
| 5,337,287 | 8/1994 | Nishikawa | 365/230.05 |
| 5,440,523 | 8/1995 | Joffe | 365/230.05 |
| 5,634,004 | 5/1997 | Gopinath et al. . | |
| 5,732,041 | 3/1998 | Joffe | 365/230.05 |

FOREIGN PATENT DOCUMENTS

| | | |
|---|---|---|
| 0187518 | 7/1986 | European Pat. Off. . |
| 5-151769 | 6/1993 | Japan . |
| WO/95/05635 | 2/1995 | WIPO . |

OTHER PUBLICATIONS

Translation of Japanese patent document No. 5–151769 (Kubo).
International Search Report PCT/US94/09364 (which cites Schiffleger and EP A0187518 above ).

*Primary Examiner*—Viet Q. Nguyen
*Attorney, Agent, or Firm*—Skjerven, Morrill, MacPherson, Franklin & Friel LLP; Michael Shenker

[57] ABSTRACT

A memory interface unit comprising a bus interface unit, a buffer which can store multiple data burst subsets in transit to or from a digital memory, and a switch which includes an externally accessible master data path for the transfer data to or from the bus interface unit and which includes an externally accessible slave data path for the transfer of data to or from the buffer and which includes a direct data path for the transfer data between the bus interface unit and the buffer.

21 Claims, 36 Drawing Sheets

MEMORY WRITE

INTERCONNECTION OF TWO STACKED BOXES

SWITCH MATRIX (2 MIU's)

BURST WRITE OPERATION (two MIU's)

BURST READ OPERATION (two MIU's)

BURST WRITE OPERATION (four MIU's)

FIG. 29 BURST READ OPERATION (four MIU's)

SWITCH MAXIMUM CONFIGURATION

EXTENDED DATA FLOW

MEMORY INTERFACE UNIT, SHARED MEMORY SWITCH SYSTEM AND ASSOCIATED METHOD

RELATED APPLICATION

This is a continuation of Ser. No. 08/512,613, filed Aug. 7, 1995, which is continuation-in-part of Ser. No. 08/109,805, filed Aug. 19, 1993, U.S. Pat. No. 5,440,523, issued Aug. 8, 1995. The application U.S. Ser. No. 08/512,613 now U.S. Pat. No. 5,732,041 issued Mar. 24, 1998 is incorporated herein.

BACKGROUND OF THE INVENTION

1. Field of Invention

The invention relates generally to memory interface systems, and more specifically to a method and apparatus for providing and arbitrating access to a shared memory by multiple devices, for applications such as multiprocessor systems and communications switching.

2. Description of the Related Art

Shared memories are used to facilitate data passing between multiple processes. A typical shared memory implementation involves the use of multiple ports. Each port may provide shared memory access to a different external device. The different devices, in turn, may be involved with the control or execution of different processes that pass the data.

In order to provide each port with access to the shared memory which is not significantly impacted by shared memory accesses by other ports, the path to the shared memory typically is designed with a bandwidth close to the sum of the bandwidths of the individual ports. This ensures that the data carrying capacity of the path is sufficiently large so that no port suffers a significant delay in accessing the shared memory even though multiple ports may seek access to the shared memory. Generally, this is achieved in one of two ways, or some combination thereof First, the shared memory access time may be designed to be much faster than the data transfer times for the individual ports. Second, the path width to the shared memory may be designed to be much greater than the path widths of the individual ports.

The first approach is to assign a time slot to each port during which data can be read from or written to the shared memory. For each port, the assigned time slot is shorter than the actual time required to transfer data through the port. Thus, the data is buffered temporarily during its transfer between a port and the shared memory. Ordinarily, the length of the port time slot is inversely proportional to the number of devices sharing access to the shared memory. A device using a particular port can gain access to the memory only during the assigned time slot for that port. Data is buffered between time slots. There have been shortcomings with this approach. For example, it often requires the memory access time to be significantly less than the port data transfer time. However, it is often impractical to have such a mismatch between data transfer rates for the ports and the shared memory.

The second approach also involves assigning a time slot to each port. For example, writes to the shared memory involve temporarily buffering multiple data words received at a respective port, and then providing them to the memory on a wide memory path all in one memory access cycle during the time slot designated for the port. Conversely, reads from the shared memory involve providing multiple words on the wide path all in one memory access cycle during a time slot designated for a respective port; temporarily buffering the words read from memory; and then transferring the words through the port. This second approach is particularly well suited to burst-mode systems in which data words are communicated in multi-word bursts through respective ports. A complete burst may be temporarily stored in a memory access buffer, and then may be written or read during a single memory access cycle through such a wide bandwidth path to the shared memory. By providing a path with an appropriately large bandwidth, each port may be made to appear to have exclusive access to the shared memory, unimpeded by data transfers through other ports.

The illustrative block diagram of FIG. 1 depicts an earlier implementation of a multi-port memory system in which k ports, each having word width m, equally share a common memory. Each burst includes k words. K memory access buffers each can store k m-bit words. Each buffer is connected to the shared memory by a k×m line wide path. The shared memory is k×m bits wide.

The illustrative drawings of FIG. 2 show a data format used in a typical multiport memory system such as that in FIG. 1. During a transfer of data into the shared memory, a k word burst of m-bit words passes through a port. The entire burst is briefly stored in a single memory access buffer. Then, during a prescribed time slot, all k-words of the burst are simultaneously transferred from the buffer and written to the shared memory on the k×m path. During a transfer of data out of the shared memory, k words are read from the shared memory during another prescribed time slot and are transferred to a single memory access buffer. Then the buffered data is transferred through the port associated with that buffer.

The port which originally inputted the burst may be different from the port that outputs the burst. The shared memory temporarily stores the burst so that it can be routed from the input port to the output port. Thus, the system of FIG. 1 can be used to pass data between ports.

More specifically, for example, in a memory write operation, k m-bit words received through a respective port are buffered by a memory access buffer assigned to that port. Subsequently, during a time slot reserved for that memory access buffer, all of the k m-bit words stored in the assigned buffer are simultaneously written to the shared memory on the shared k×m-bit wide path. In a like manner, each of the other buffers can store k m-bit words on behalf of their own associated ports. The entire contents (all k words) of each individual buffer can be written to the shared memory during the individual time slot reserved for that buffer. A memory read operation is analogous, with the steps of the write operation reversed.

A disadvantage of this prior implementation is the large number of interconnection pins between a buffer and the bus in a large multi-port system. FIG. 3 is a block diagram depicting another conventional multi-port shared memory system. The data format used involves 16 word bursts of 72 bits per word (64-bit data plus 8-bit parity). The shared memory bus has a width of 1152 lines (16 words×72 bits/word). The bus is connected to each of 16 memory access buffers. Each buffer would need more than 1224 data pins, 1152 to connect to the bus and 72 to connect to the port. Unfortunately, the 1152 data pins connected to the bus would each require high drive capability to operate on a bus connected to all 16 buffers and to the shared memory. FIG. 3 shows an illustrative bus capacitance that must be overcome by the buffer pins.

Thus, there has been a need for an improved architecture for providing multiple port access to a shared memory. The architecture should require fewer pins for memory access buffers and should not require high drive capability for buffer pins. The present invention meets those needs.

SUMMARY OF THE INVENTION

In one aspect of the invention, a novel memory interface unit is provided. It includes a bus interface unit and a buffer which can store multiple data burst subsets in transit to or from a digital memory. A switch includes an externally accessible master data path which transfers data to or from the bus interface unit. An externally accessible slave data port transfers data to or from the buffer. A direct path transfers data between the bus interface unit and the buffer.

DETAILED DESCRIPTION OF THE PREFERRED EMBODIMENTS

The present invention comprises a novel method and apparatus for implementing a multi-port shared memory system. The following description is presented to enable any person skilled in the art to make and use the invention. Descriptions of specific applications are provided only as examples. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 1:
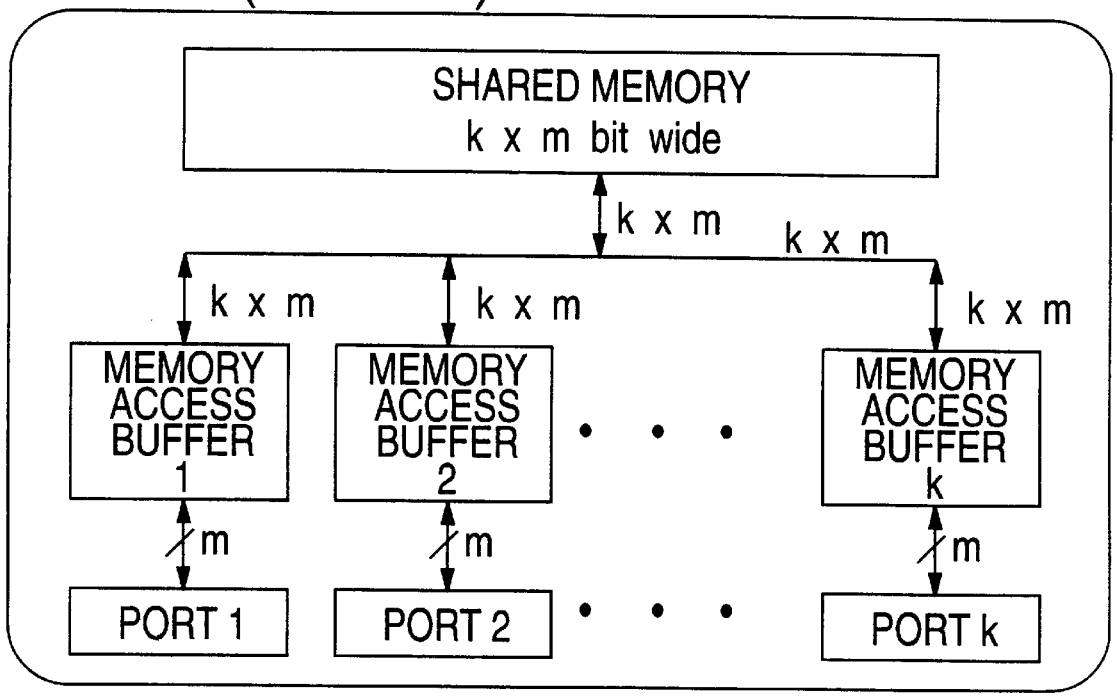
FIG. 1 is a block diagram of an earlier multi-port shared memory system.
Figure 2:
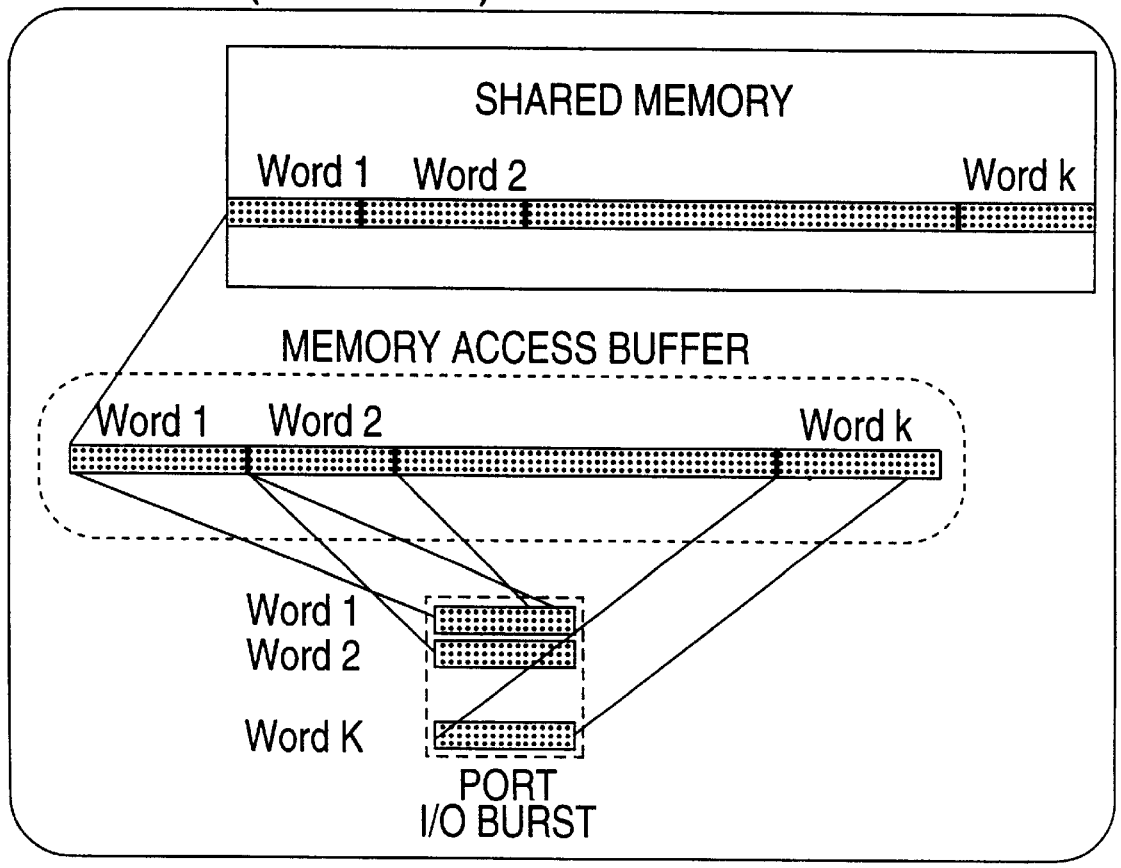
FIG. 2 is a data format which can be used in the earlier system of FIG. 1.
Figure 3:
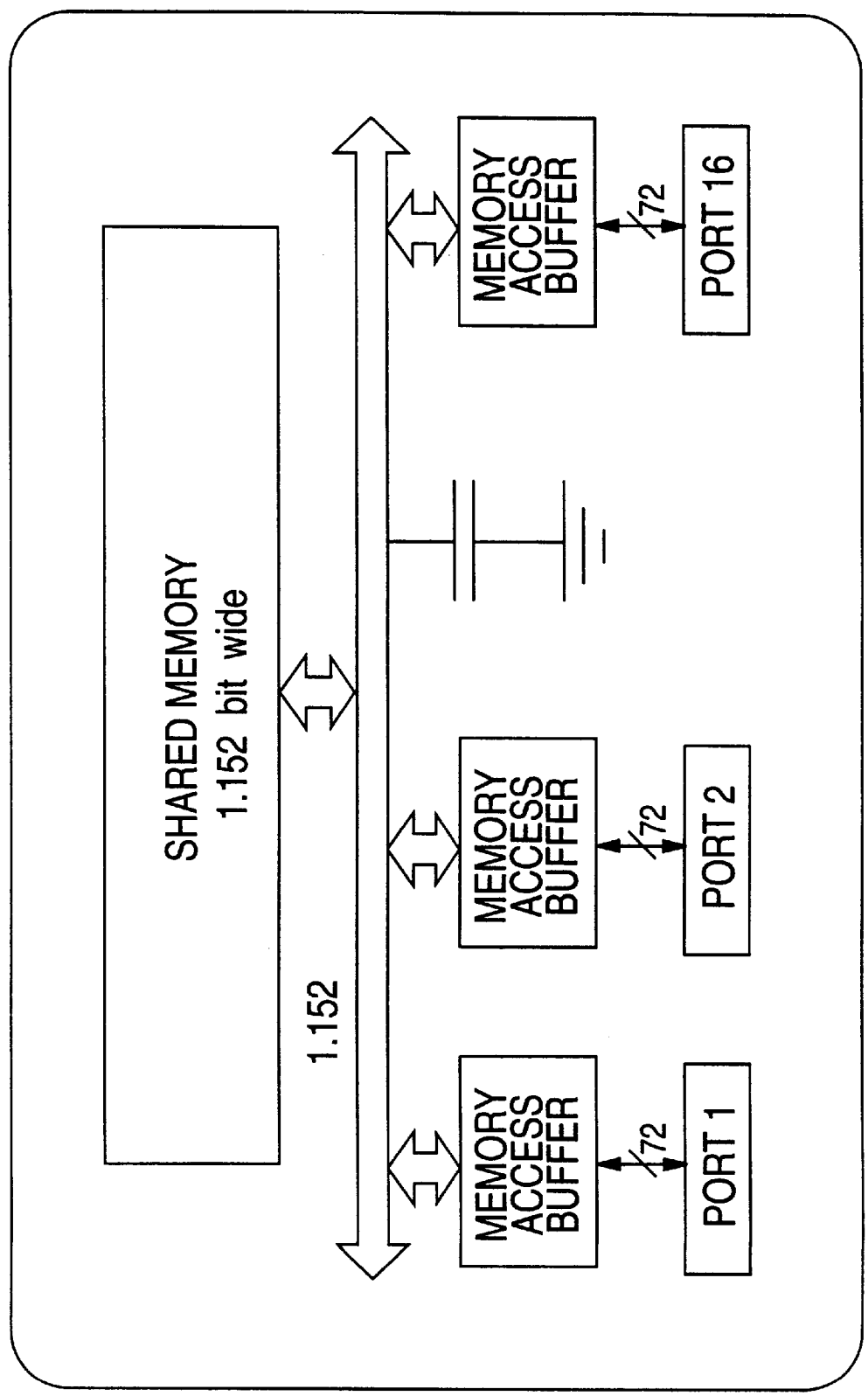
FIG. 3 is a block diagram of another earlier multi-port shared memory system.
Figure 4:
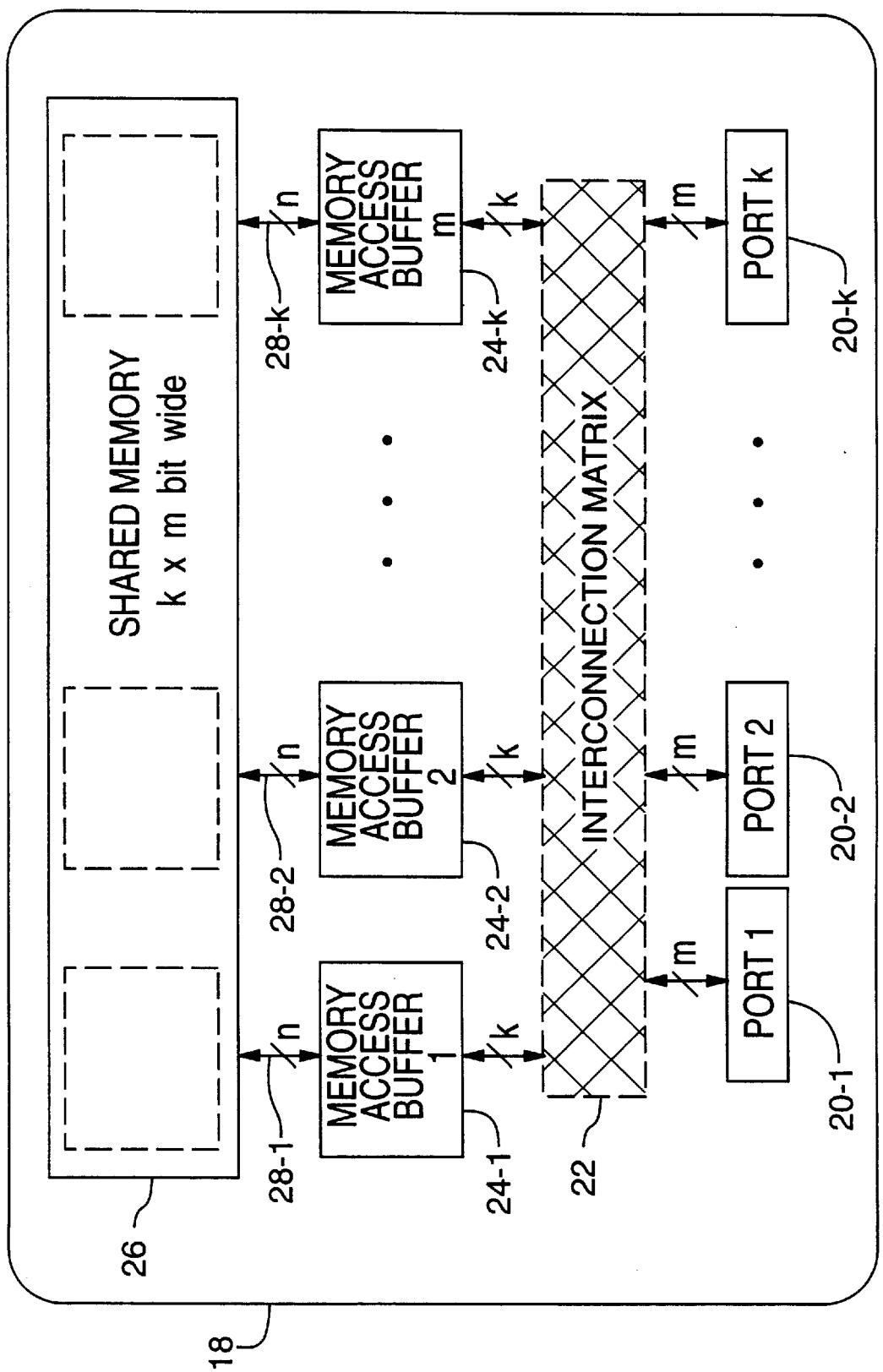
FIG. 4 is a generalized block diagram of a first multi-port shared memory system in accordance with the present invention.

Referring now to FIG. 4, there is shown a block diagram of a first multi-port shared memory system 18 in accordance with the present invention. The first system 18 includes a set of k ports 20 each inputting/outputting m-bit data words in n-word bursts, an interconnection matrix circuit 22, a set of m memory access buffers 24, and a shared memory 26. A port serves as a two-way digital path on which digital information can be transferred to or from external circuitry such as a data bus. Port structures are well known to those skilled in the art and need not be described herein. Specific regions within the shared memory 26, indicated by dashed lines, are reserved for subsets of the data temporarily stored in the buffers 24.

During memory write operations, the ports 20 transfer binary data from individual external devices (not shown) connected thereto. These ports 20 provide the received binary data to the interconnection matrix 22, which distributes the data transferred through the ports among the memory access buffers 24. In the present embodiment, the distribution is accomplished such that each memory access buffer 24 receives a subset of the data transferred by each of the ports. In the present embodiment, each buffer 24 can transfer in parallel to memory 26 all of the data received by the buffer from an individual port. Moreover, all of the parallel transfers of data received from such an individual port can occur during a single memory access cycle.

The memory read operation is analogous with the steps of the write operation, but reversed. That is, the bits for n m-bit words are transferred from the shared memory and are distributed among the memory access buffers 24. The interconnection matrix 22 then provides the distributed bits to a single port 20 through which a burst comprising n m-bit words is transferred to an external device (not shown).

Figure 5:
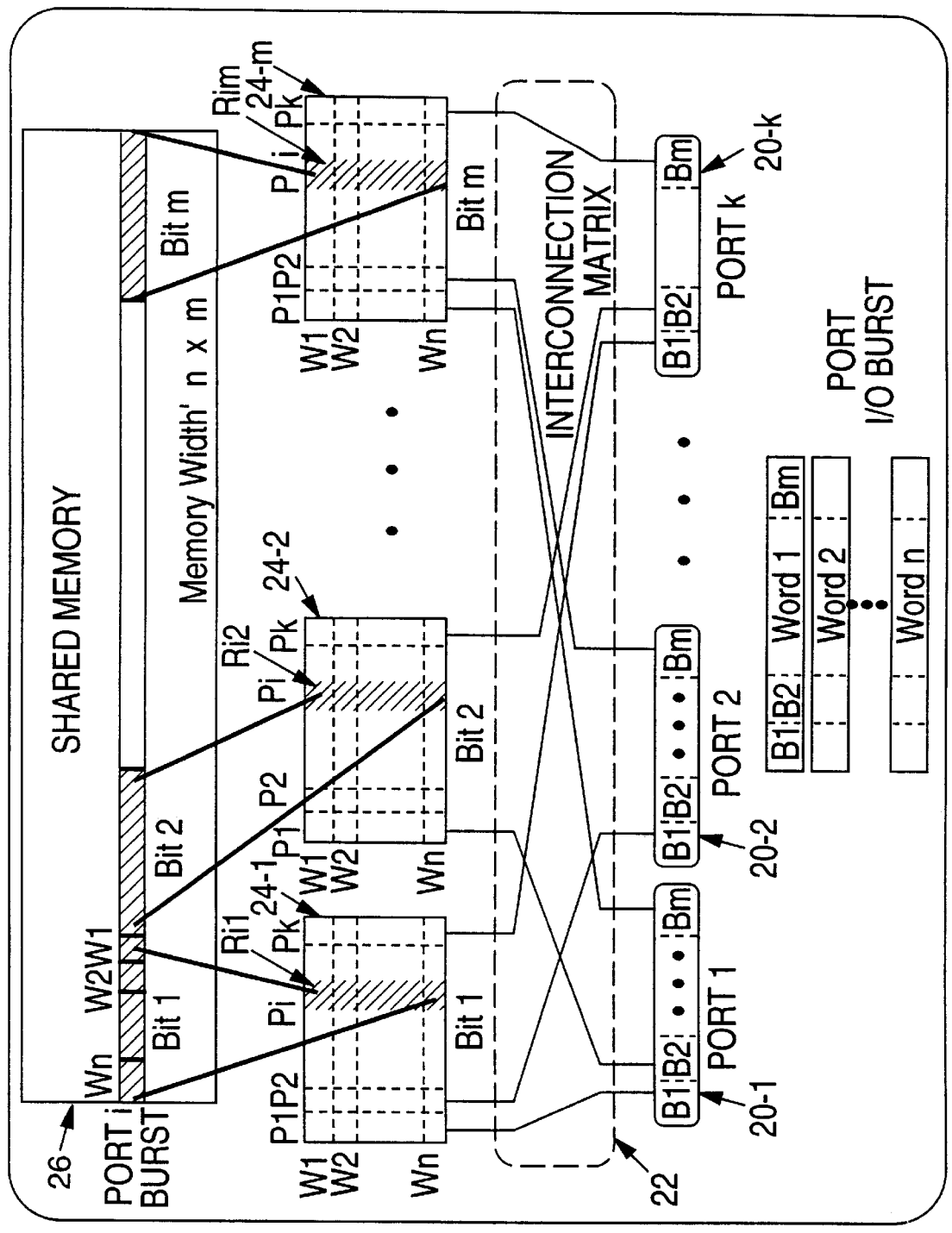
FIG. 5 shows a data format and data flow used in the embodiment of FIG. 4.

Referring now to FIG. 5, a diagram is shown which illustrates details of the interconnection matrix circuit 22, the data format and data flow presently used in the first system 18. Each memory access buffer 24 is dedicated to storing a specific bit position for every data word transferred through any of the ports. Data words may contain data and parity information. In a presently preferred embodiment, the total number of memory access buffers 24 is equal to the total number of bits per word (m), thus allowing each buffer to be responsible for a single bit position in every word. For example, memory access buffer 24-1 stores bit 1 (B1) of each word transferred through any of the ports 20-1 to 20-k; memory access buffer 24-2 stores bit 2 (B2) of each word transferred through any of ports 20-1 to 20-k; etc.

Referring again to FIG. 4, each memory access buffer 24-1 through 24-m is connected to the shared memory 26 by a set of n data lines 28-1 through 28-k. Thus, the m-subsets, each subset with n bits, of different order bits can be simultaneously transferred between the memory 26 and the buffers 24. In the present embodiment, there are n-bits for each of the m-subsets; that is, one bit for each of the n words in an n-word burst. Specifically, if there are n-words per burst, and there are m-bits per word then there are n-bits per burst of order B1, n-bits per burst of order B2, ..., and n-bits per burst of order Bm. All n-bits of a prescribed order can be simultaneously provided to the memory 26 on the n lines connected to a buffer assigned to store the bits of that order. For example, all n of the B1 bits are provided on the n lines connected to buffer 24-1. This means that the m buffers can transfer n words at a time to or from an addressed location of memory. As explained below, all of these transferred words would have originated at or been targeted to the same external device.

Each port 20 transfers data in a prescribed format between the interconnect matrix 22 and external circuitry (not shown). In this document, a "port burst" shall mean a data burst transferred through a single port in either direction to or from the external circuitry. In a present embodiment as shown in FIG. 5, m-bit data words may be presented by a port to the interconnect matrix 22 for transfer to the buffers 24. Conversely, m-bit data words may be presented to such a port by the interconnect matrix 22 for transfer to the external circuitry. The data word format involves, for each, data words bits B1 through Bm presented in a prescribed order. The interconnect matrix distributes the bits as described above.

The interconnect matrix circuit 22, for example, can be implemented using a printed circuit board (PCB), wire wrap or soldered wires. In the currently preferred embodiment, the interconnect matrix provides the connections between ports and buffers. As explained below, for example, each B1 in each word transferred through port 20-1 is connected by the matrix 22 to a storage element of buffer 24-1 associated with port 20-1; each B1 in each word transferred through port 20-2 is connected by the matrix 22 to a storage element of buffer 24-1 associated with port 20-2; ... each B1 in each word transferred through port 20-k is connected by the matrix 22 to a storage element of buffer 24-1 associated with port 20-k.

Figure 6:
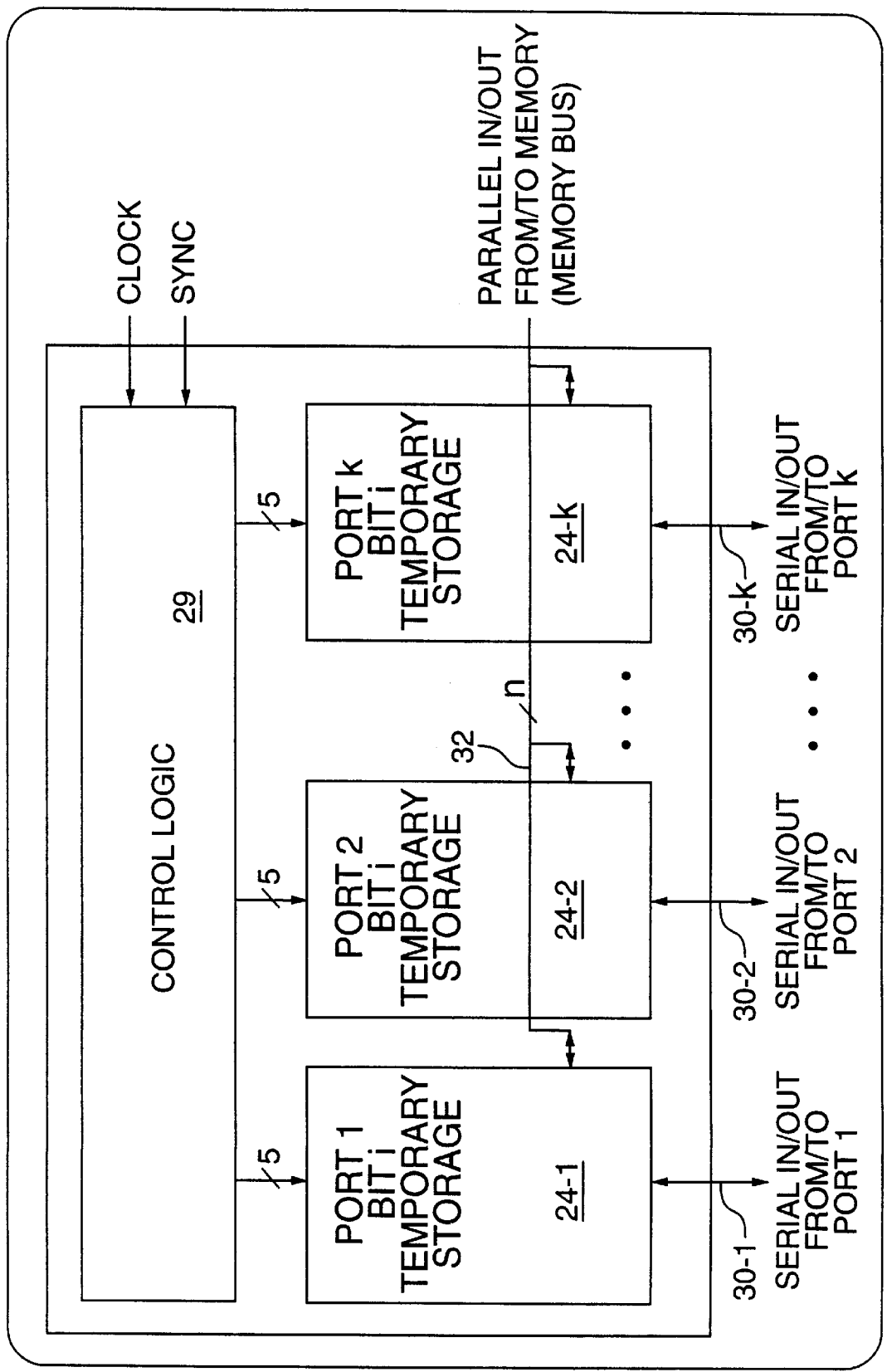
FIG. 6 is a more detailed block diagram of memory access buffers and control logic of the embodiment of FIG. 4.

The memory access buffers can be implemented using either standard or custom logic. The drawings of FIGS. 6–9 illustrate and explain the operation of the memory access buffers 24 and a representative dual register pair 34 of one of the memory access buffers 24. The illustrative block diagram of FIG. 6 shows the memory access buffers 24, control logic 29, serial input/output lines 30 connecting the buffers 24 to an interconnect matrix (not shown) and a n-bit parallel input/output bus 32. The control logic 29 controls serial I/O on lines 30 and parallel I/O on bus 32. The operation of the control logic will be explained with reference to the timing diagram of FIG. 8.

Figure 7:
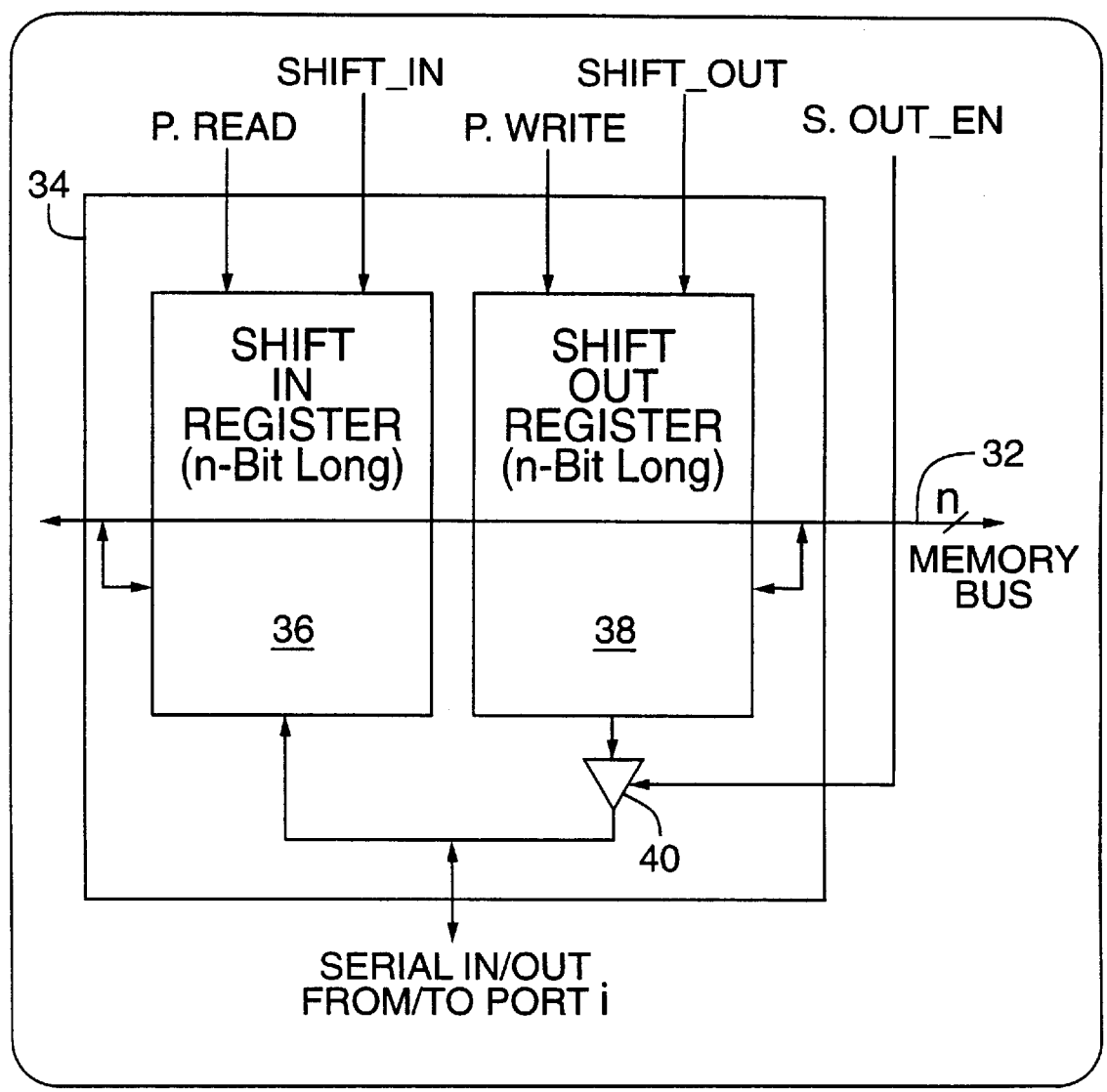
FIG. 7 is a block diagram of a representative dual register pair of the memory access buffers of FIG. 6.

Referring to FIG. 7, there is shown a representative dual n-bit register pair 34. In a present embodiment of the invention, each memory access buffer 24 includes k dual register pairs like the one shown in FIG. 7 for a total of 2 k registers per buffer 24. Each register pair in each buffer is associated with one of the ports. Each register pair is dedicated to storing all bits in a prescribed location (order) in every data word transferred to or from the port associated with that register pair. That is, each respective dual register pair of a respective buffer stores and transfers all of the same order bits from each data word transferred through a respective port.

For example, referring to FIG. 5, in buffer 24-1, dual register pair $R_{i1}$ receives and stores the first (in order) bit B1 of each data word transferred through port $P_i$ (not shown). In buffer 24-2, dual register pair $R_{i2}$ receives and stores the second (in order) bit B2 of each word transferred through port $P_i$. In buffer 24-m, dual register pair $R_{im}$ receives and stores the $m_{th}$ (in order) bit Bm of each word transferred through port $P_i$. Thus, for example, all B1s transferred through port $P_i$ represent a subset of the data transferred through that port. Similarly, all B2s represent another subset as do all $B_m$, for example.

Referring to FIG. 7, there are shown details of a shift-in/shift-out register pair of a representative one of the memory access buffers. The dual register pair 34 includes a shift-in register 36 and a shift-out register 38. The shift-in register 36 first stores and then asserts in parallel n bits of data onto the memory bus 32 to be written into the shared memory 26. The shift-out register reads in parallel and stores n bits of data from the memory bus 32 which have been read "out" of the shared memory 26.

The data stored in the shift-in register 36 is serially shifted from the interconnect matrix 22 into the shift-in register 36; and from there, it is asserted in parallel onto the bus 32 to be written into the memory 26 as described above. Conversely, the data stored in the shift-out register 38 is read in parallel from the bus 32 into the shift-out register after it has been read from the memory 26; and from there, it is serially shifted from the shift-out register to the interconnect matrix 22. Output enable buffer 40 controls the serial transfer of data from the shift-out register 38 to the interconnect matrix 22.

Figure 8:
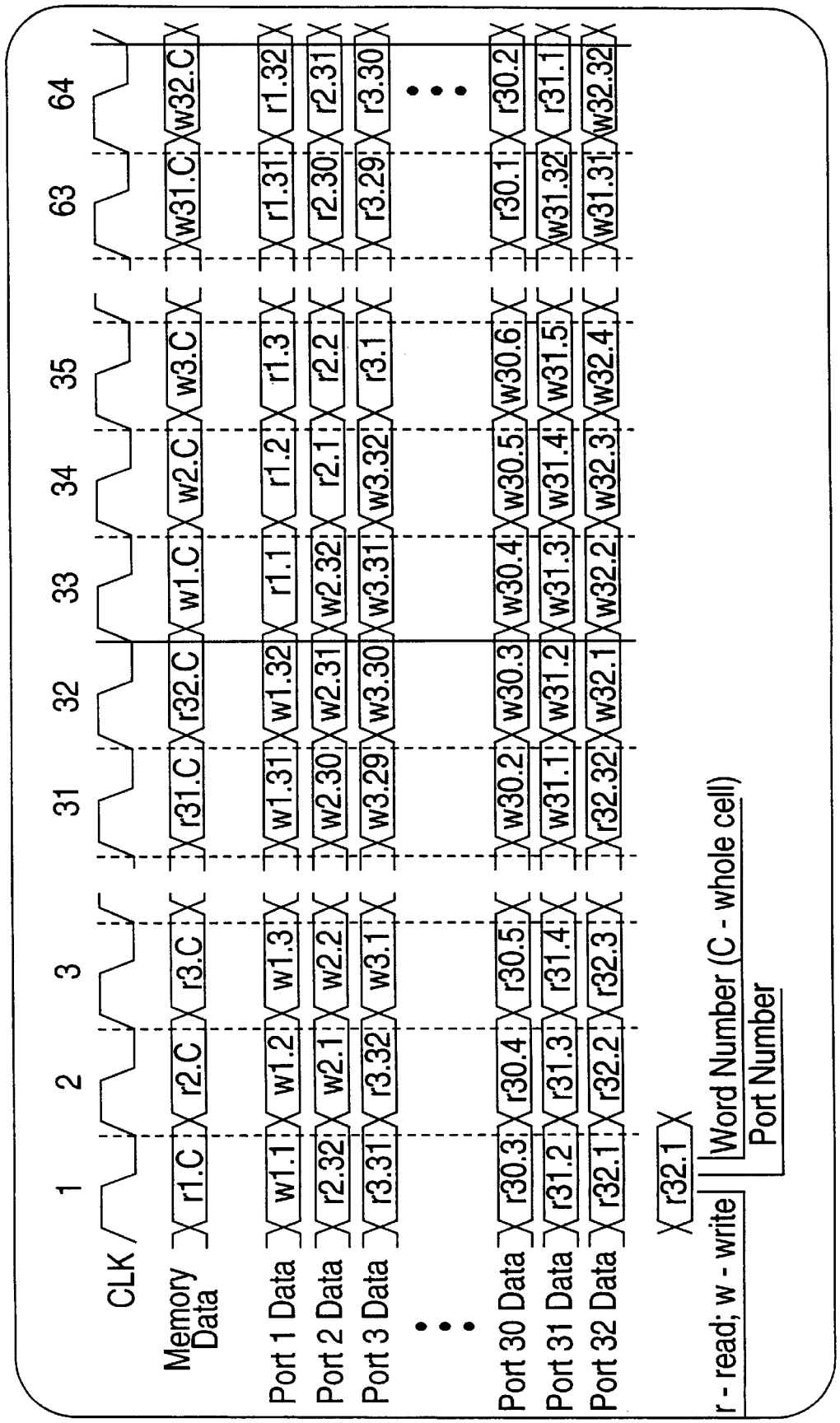
FIG. 8 is a timing diagram which explains the operation of the control logic and memory access buffers of FIG. 6.

Referring to FIG. 8, there is shown a timing diagram for the memory access buffers 24-1 to 24-m of FIGS. 4–6. The timing diagram of FIG. 8 depicts the timing for a thirty-two port system (k=32), with each port having a burst size of thirty-two words (n=32). Thus, n=k. In a present embodiment, memory access alternates between 32 memory read cycles followed by 32 memory write cycles.

Focusing first on the timing of memory writes, during the Memory Data Write period (clock ticks 33–64), a different thirty-two word burst of data can be written to the common memory 26 for each port 20. Each port has a clock cycle during which data transferred through that port can be written to memory 26. Consecutive ports' data are written on consecutive clock cycles, which are the respective write "time slots" for the respective ports. In order to prepare for the write time slot allocated to it, each port can begin transferring data to the memory access buffers thirty-two clock cycles before its time slot, so that there is sufficient time to transfer all thirty-two words of a burst received by a port to the m buffer registers (each located in a different memory access buffer) assigned to the port before the arrival of the port's time slot. Thus, during the thirty-two clock cycles preceding the "w1.C" on the Memory Data timing line, there are thirty-two serial bit transfers from port 20-1, via the interconnect matrix 22, to the memory access buffer 24-1, depicted as "w1.1", "w1.2" . . . "w1.32" on the port 20-1 Data line. Since each port has a different time slot, the transfers from the ports are appropriately staggered so that each port's burst is ready to transfer to the shared memory just prior to the port's time slot.

More specifically, for example, during each Port 20-1 Data Write Cycle shown in FIG. 8 all of the bits in a first word transferred through Port 20-1 are distributed by the interconnect matrix 22 among the assigned, dual port register pairs of the memory access buffers 24. For example, assuming that there are thirty-two words per burst (n=32) and m bits per word, then during the first Port 20-1 Data Write Cycle, (w1.1) bit 1 (B1) of word 1 (W1) transferred through Port 20-1 is serially written to a prescribed register pair in buffer 24-1; B2 of W1 is serially written to a prescribed register pair in buffer 24-2; B3 of W1 is serially written to a register pair in buffer 24-3; etc. Bm of W1 is serially written to a register pair in buffer 24-m.

Similarly, for example, during the 32nd Port 20-1 Data Write Cycle (w1.32), B1 of W32 transferred through port 20-1 is serially written to the same register pair of buffer 24-1 as was B1 of W1 transferred through port 20-1. Likewise, for example, during the third Port 20-1 Data Write Cycle (w1.3), B6 of W3 transferred through port 20-1 is serially written to the same register pair in memory access buffer 24-6 (not shown) as was B6 of W1 transferred through port 20-1.

Thus, during each of the thirty-two Data Write Cycles for port 20-1 (w1.1 through w1.32), data is serially shifted into designated shift-in registers in the respective memory access buffers 24-1 through 24-m. During Memory Data Cycle w1.C, all of the data that has been serially shifted into the shift-in registers for port 20-1 during the thirty-two prior serial shift-in cycles (w1.1 through w1.32) are asserted in parallel onto the bus 32 so they can be written into the shared memory 26.

Similarly, during the Memory Read period (clock ticks 1–32), thirty-two words of data can be read from the shared memory for each port. For example, during a single one clock memory access cycle at r1.C, thirty-two words can be read from memory 26; these words can be transferred to an external device through port 20-1. Thus, r1.C is the read "time slot" for port 20-1. Likewise, for example, r31.C represents the read time slot for port 20-31.

Specifically, for example, at time slot r1.C a shift-out register in buffer 24-1 receives in parallel all B1s of the thirty-two words read in parallel from the memory 26. Similarly, for example, at time slot r1.C a shift-out register in buffer 24-18 (not shown) receives in parallel all B18s of the thirty-two words read in parallel from the memory 26.

During the thirty-two port 20-1 Data Read Cycles (r1.1 through r1.32) the words read from the memory 26 during Memory Data Read Cycle (r1.C) are serially transferred, via the interconnect matrix 22, to port 20-1. For example, during Data Read Cycle (r1.1), all of the bits for the first word (W1) to be transferred out through port 20-1 are simultaneously serially shifted from m different shift-out registers in m different buffers 24, via the matrix 22, to provide W1 to port 20-1. Likewise, for example, during Data Read Cycle (r1.31), all of the bits for the thirty-first word (W31) to be transferred out through port 20-1 are simultaneously serially shifted from m different shift-out registers in m different buffers 24, via the matrix 22, to provide W31 to port 20-1.

Thus, when data received at a prescribed port is to be written into memory 26, the interconnect matrix distributes the data word bits among buffers 24-1 to 24-m so that each buffer only stores a subset of each word to be stored. In the preferred embodiment each buffer stores only bits of a prescribed order. Thus, each buffer need only provide to the bus 32 a subset of all of the data to be simultaneously transferred to memory.

Conversely, when data read from memory is to be output to a prescribed port, the interconnect matrix recombines the bits distributed among multiple buffers so that they are outputted as a series (or burst) of complete words. The entire data to be transferred out through a port is outputted in parallel from the memory and is inputted to the buffers. However, each buffer only receives a subset of that entire data. The interconnect matrix 22 recombines the subsets into a burst of data words.

Thus, each of the m respective buffers simultaneously connects one n-bit subset at a time to its parallel bus 32. As illustrated in FIG. 4, there are only m×n connections at any given time between the m buffers and the shared memory 26. Therefore, each buffer requires fewer terminals to interconnect with the shared memory, and there is less capacitive loading due to the fewer connection terminals.

Figure 9:
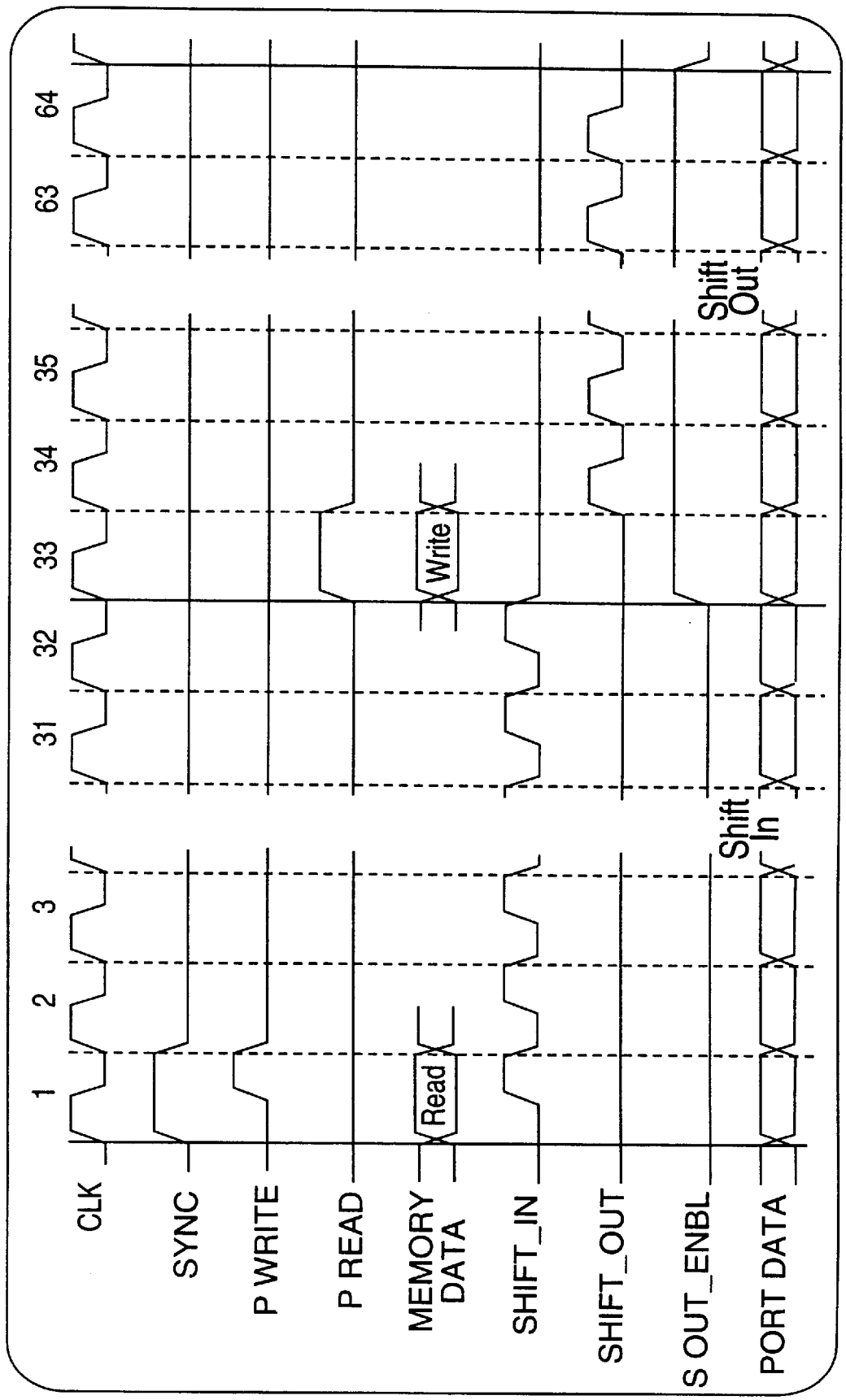
FIG. 9 is a timing diagram which explains the operation of the dual register pairs of FIG. 7.

The illustrative timning diagram of FIG. 9, shows the operation of the dual register pair of FIG. 7. During the P.WRITE pulse, data that has been read from the shared memory 26 during an (rX.c) Memory Data Cycle is written in parallel into the shift-out register 38. During each SHIFT-OUT pulse, a single bit is shifted out from the shift-out register to the interconnect matrix 22 for transfer to a respective port. For example, for buffer 24-1, each SHIFT-OUT pulse corresponds to an r1.X pulse in FIG. 8. During each SHIFT-IN pulse, a single bit of data is shifted in to the shift-in register. For example, for buffer 24-1, each SHIFT-IN pulse corresponds to a w1.X pulse in FIG. 8. During the P.READ pulse, all of the data that has been shifted in to the shift-in register can be read in parallel to be written to the shared memory 26 during a w1.C cycle.

In the present embodiment, the shared memory 26 can be a standard random access memory (RAM) configuration with a memory width of (n×m). Thus, the memory is able to transfer (n×m) bits of data to or from the memory access buffers 24 simultaneously, and is able to store all (n×m) bits in a single addressed location of memory, as depicted in FIG. 5. In the present embodiment, rather than store each word from a port as contiguous bits, the words are "interleaved", so that all the first order bits (B1s) are stored contiguously, followed by all of the second order bits (B2s), and so forth. In this configuration, all of the bits representing the n words from or to a specific port 20 can be readily stored as a line of the shared memory 26.

In the present embodiment, time slots are pre-assigned. However, time slots could be arbitrated based on priorities. Moreover, since in the current embodiment each of the k ports 20 requires a single clock cycle time slot to communicate with the shared memory 26, and each port requires n clock cycles prior to that time slot to transfer an entire n-word data burst to or from the memory access buffers 24, it is efficient to set the number of words per burst (n) equal to the number of ports (k), thereby providing a smooth, cyclical process for transferring data without bottlenecks or idle times. The relationship between the number of ports and words per burst can change, however, without departing from the invention.

Figure 10:
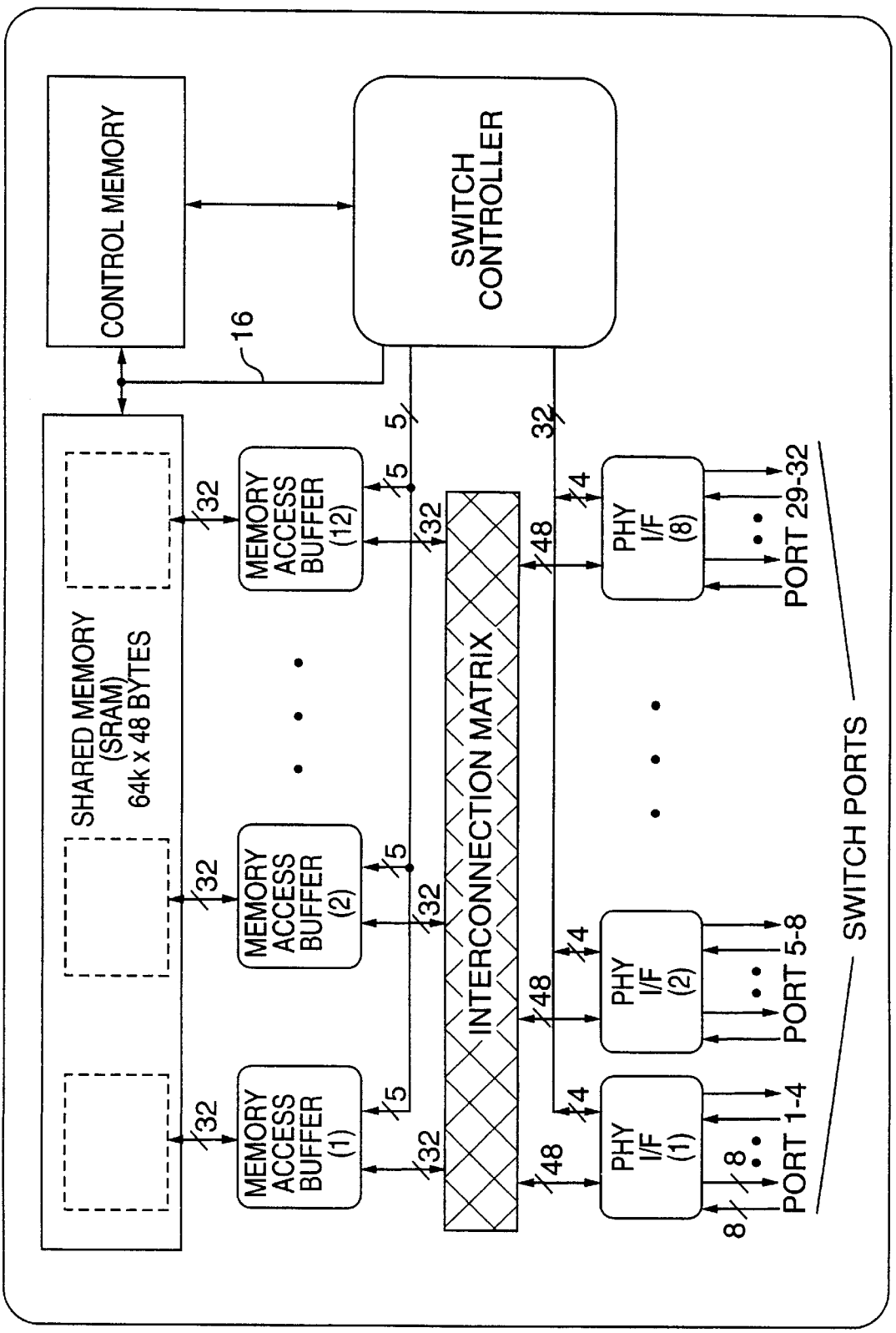
FIG. 10 is a block diagram of an Asynchronous Transfer Mode switch in accordance with the present invention.

FIGS. 10 is a block diagram of 32-port Asynchronous Transfer Mode (ATM) switch in accordance with the present invention. ATM is a payload multiplexing technique for information transfer using fixed-size packets, called cells. In a current implementation, an ATM cell is 53-bytes long and consists of a 5byte header which carries the routing information, followed by a 48-byte information field (payload). The payload of each ATM cell entering the switch is placed in a specific location in the shared memory. As the ATM cell payload is 48-bytes wide (8 bits per byte), shared memory is made 384-bits wide (48×8=384). This implementation was selected to have a 32-bit bus from the memory access buffers to the memory with each port word 12-bits wide, and with port bursts of thirty-two words. Note that 384 is also equal to (12×32); that is, a cell is transferred in a 32-word burst of 12-bit words.

The ATM switch routes each received cell on a port to a destination port according to routing information that is included in each such cell. More particularly, a cell is transferred from a port and stored in shared memory. Then it is retrieved from the shared memory and is transferred to a destination port indicated in the cell. In this manner, data can be switched between ports. The operation of the control memory and the switch controller will be understood by those skilled in the art, form no part of the invention and need not be described herein.

Figure 11:
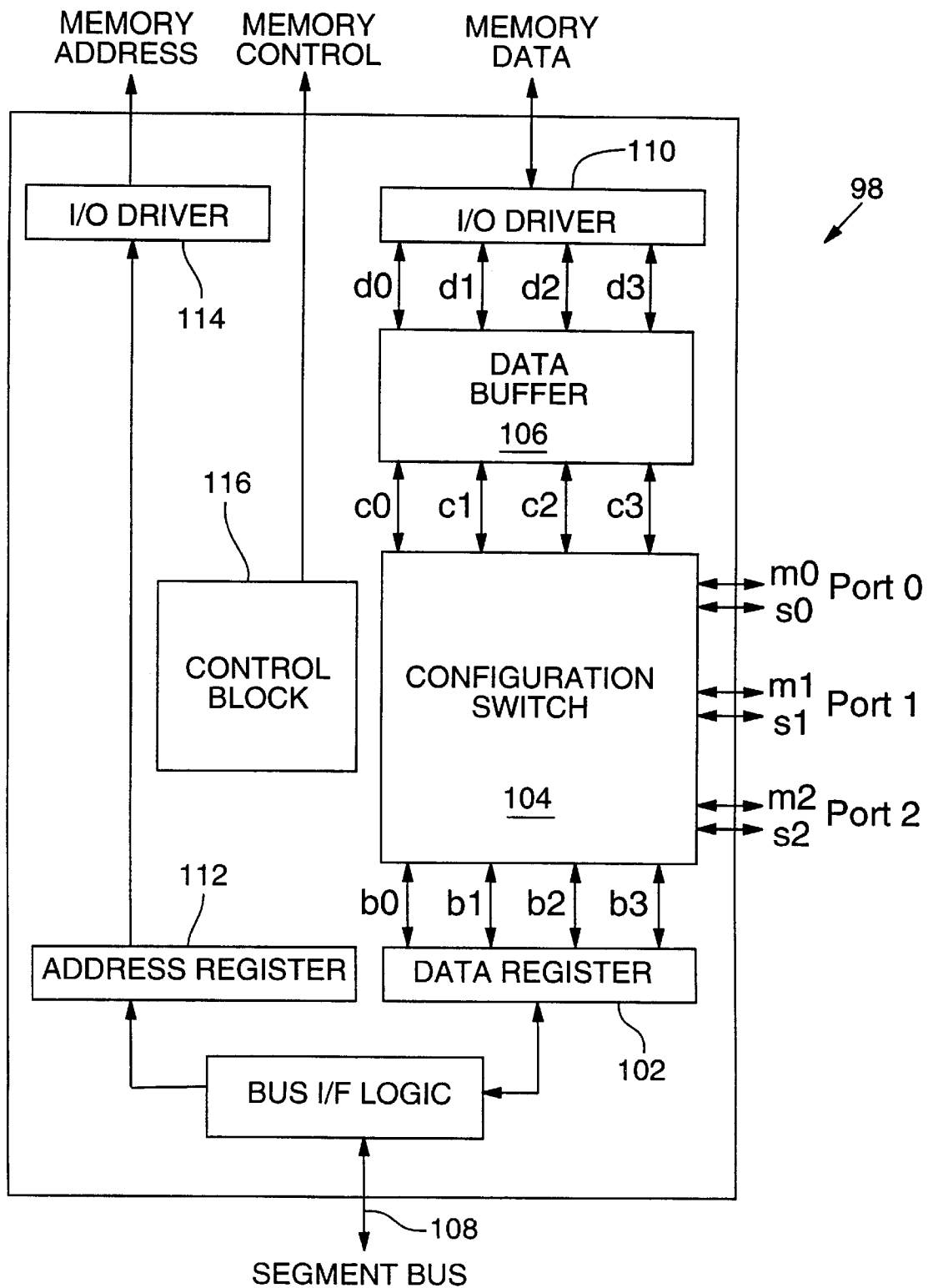
FIG. 11 is a block diagram of a switch system which includes a memory interface unit (MIU) and associated control circuitry and registers in accordance with a presently preferred embodiment of the invention.

The illustrative drawing of FIG. 11 shows a block diagram of a switch system 98 which includes a memory interface unit (MIU) 100 in accordance with a presently preferred embodiment of the invention. The MIU 100 includes a configurable switch 104 and a data transfer buffer 106. A bus interface register 102 is coupled to transfer digital information to and from a burst mode bus 108. The data transfer buffer 106 is coupled to temporarily store data in transit between a digital memory (not shown) and the configurable switch 104. Digital data is transferred to and from the memory via an i/o driver 110. An address register 112 receives digital address information from the bus 108. Address information received by the register 112 is provided to the digital memory via another i/o driver 114. A control unit 116 controls the operation of the MIU 100 and the memory.

Figure 19:
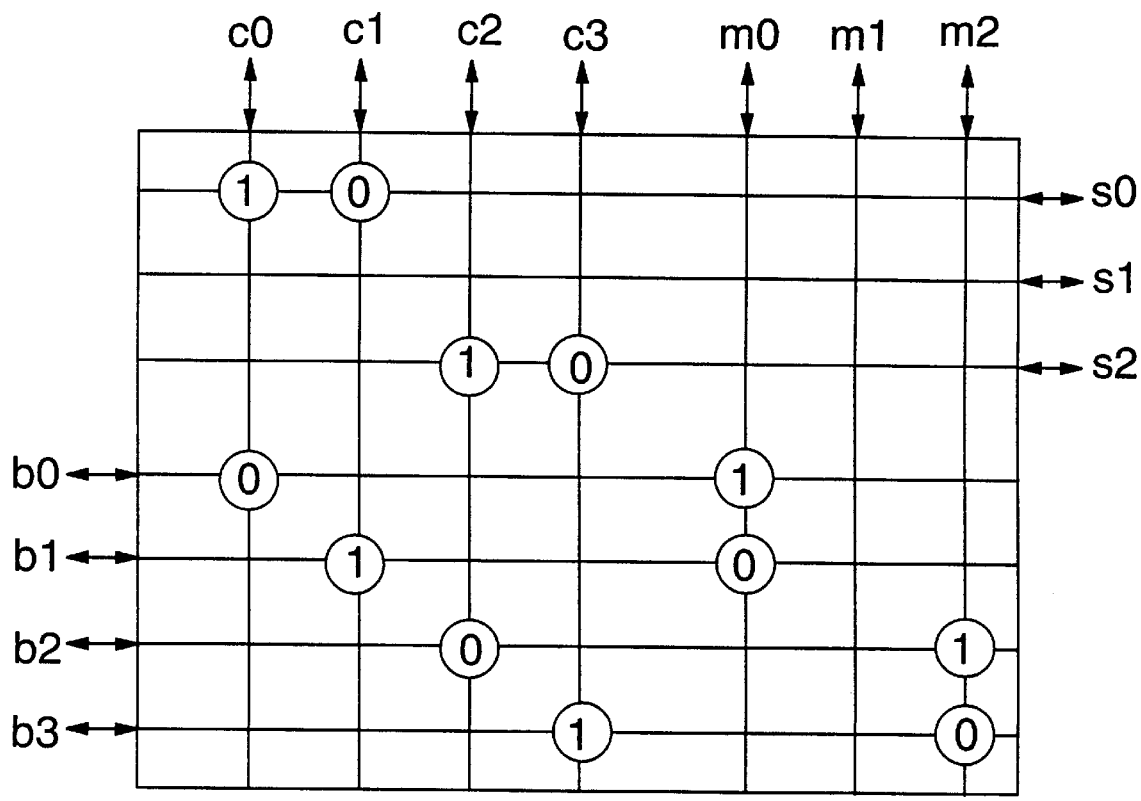
FIG. 19 is a matrix that represents interconnections among configurable switches of the two MIU system of FIG. 17.
Figure 26:
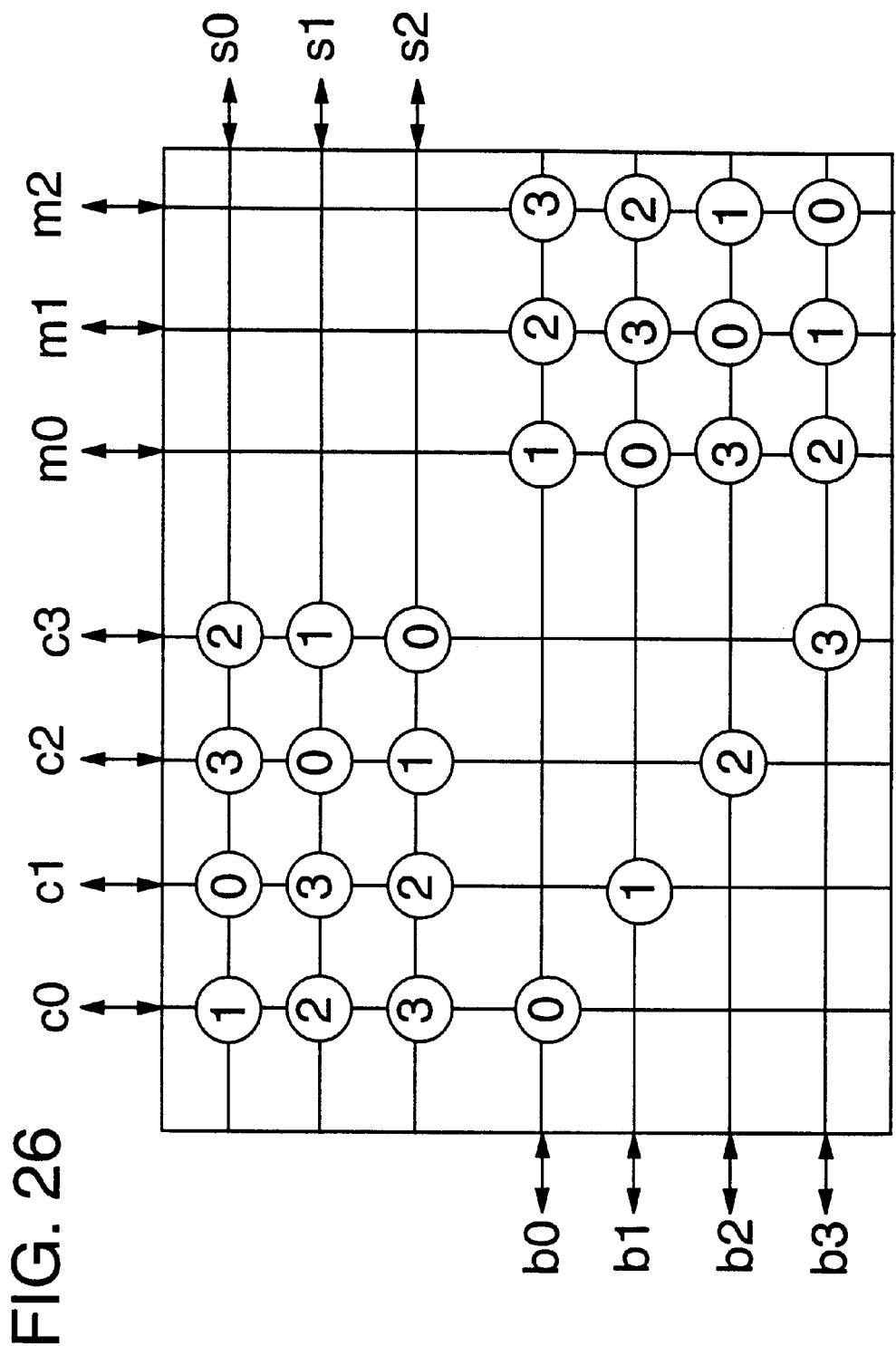
FIG. 26 is a matrix that represents interconnections among MIUs of the four MIU system of FIG. 24.

The configurable switch 104 of a present embodiment of the invention is selectively configurable to transfer burst subsets between the bus interface register 102 and either the transfer buffer 106 or the master ($m_n$) interconnects of ports p0, p1 or p2. The switch 104 is further configurable to transfer burst subsets between the transfer buffer 106 and either the bus interface register 102 or the slave interconnects ($s_n$) of ports p0, p1 or p2. In a presently preferred embodiment of the invention, the switch 104 can be placed in any of three different configurations: stand alone, 2 MIU and 4 MIU. In the stand alone configuration data is passed directly through the switch 104 from lines b0–b3 to lines c0–c3. The connections in the two MIU case are illustrated in FIG. 19. The connections in the four MIU cases are illustrated in FIG. 26.

The switch system of the present invention, therefore, permits the sharing of memory among different ports, where each port is connected to a different burst mode bus. A burst mode bus, such as PCI, SBUS or GIO, for example, permits the provision of an address which accompanies the data provided on the bus. In addition, individual MIUs can be "chained" together or "stacked" in order to coordinate access to a shared memory by devices connected to different burst mode buses.

Figure 12:
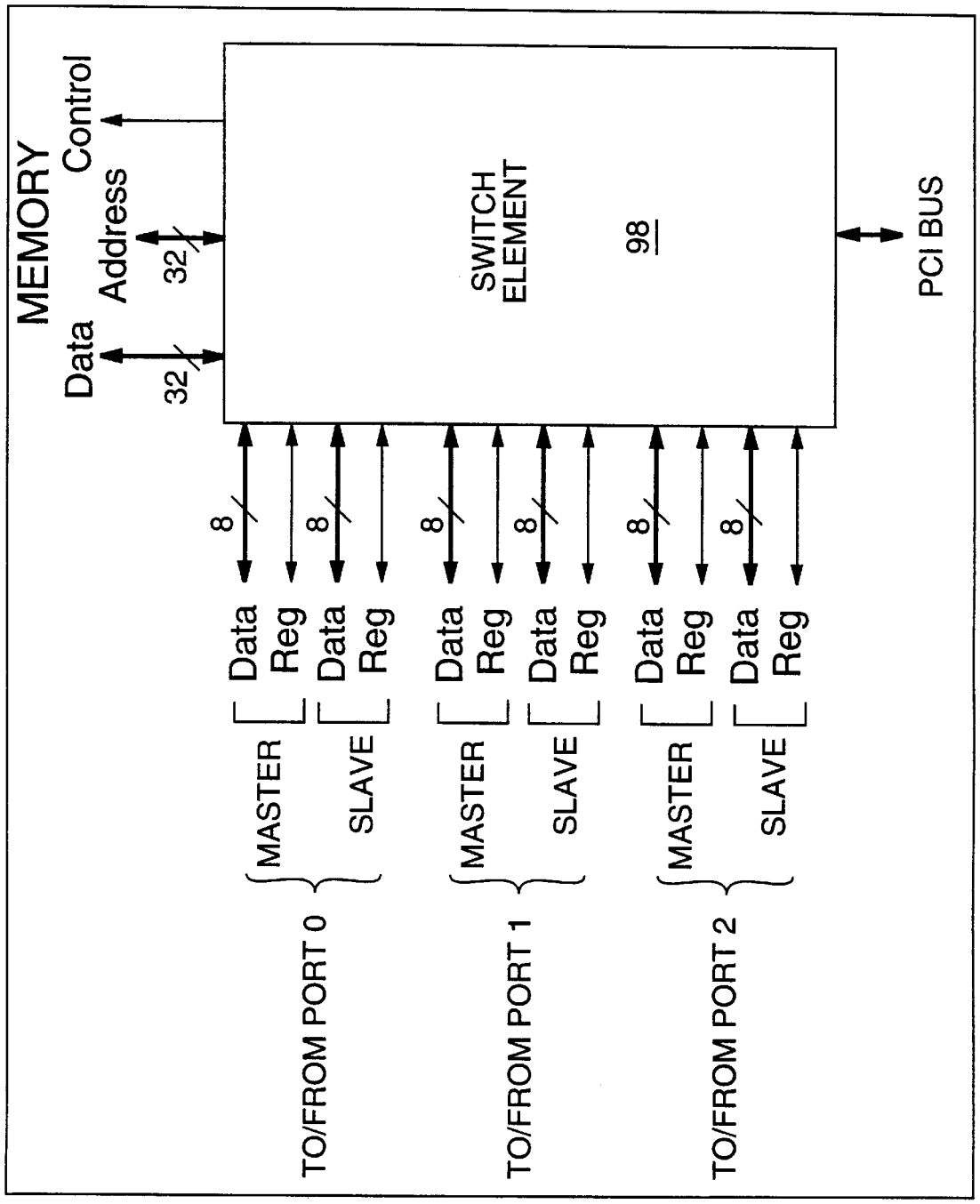
FIG. 12 is a simplified block diagram illustrating data lines and control lines of the embodiment of FIG. 11.

FIG. 12 is an illustrative block diagram showing in more detail the data lines and control lines of the switch system 98 of FIG. 11. The system 98 transfers signals to and from a bus. In a current embodiment, the bus is a PCI bus. However, the MIU can communicate with other types of burst mode buses such as SBUS, GIO, etc. Data, address and Read/Write control signals can be provided to a digital memory connected to the switch system 98. The system 98 includes three ports, p0, p1 and p2 that can, for example, be used to transfer signals to other switch systems (not shown). Each port includes eight master data lines and one master request line. Each port also includes eight slave data lines and one slave request line. Data is transferred to and from the transfer buffer 106 shown in FIG. 11. Addresses are provided by the address register 112. R/W signals are generated by the controller 116. The port interconnects provide access to the configurable switch 104.

Referring again to FIG. 11, the operation of the novel switch system 98 shall be explained by first detailing a memory write operation and then detailing a memory read operation. During a write, a burst of digital information is transferred from the bus 108 to the bus interface register 102. In a current embodiment, the bus 108 is 32-bits wide, and the burst may include a 32-bit wide address word followed by four 32-bit wide data words. The burst is transferred, via the multibit lines labeled b0, b1, b2 and b3, to the configurable switch 104. The switch 104 can be configured to transfer certain subsets of the burst via one or more of the multibit lines labeled c0, c1, c2 and c3, directly to the data transfer buffer 106. The switch 104 also can be configured to provide the remaining subsets of the burst to one or more other switch systems (not shown) associated with other memories (not shown) via one or more of the master interconnects labeled m0, m1, and m2, respectively accessible through port 0, port 1 and port 2. The subsets provided to other switch systems via the master interconnect (s) are stored in the digital memories associated with those other systems. The storage of subsets transferred to other memories shall be discussed below in connection with exemplary two MIU and four MIU systems. The transfer buffer 106 temporarily stores the subsets transferred to it, and then provides them, via one or more of the multibit lines labeled d0, d1, d2 and d3, to the i/o driver 110 which presents them for storage in a digital memory associated with switch system 98. Digital address signals received from the bus 108 in conjunction with the burst are used to designate the memory locations where the subsets are to be stored. In a current embodiment, the same memory address is used for both the memory associated with switch system 98 and for other memories associated with other switch systems. Thus, different subsets of the burst may be stored at the same address in different memories.

At the beginning of a memory read operation, the subsets of a burst may he distributed among several distinct digital memories (not shown in FIG. 11) that are accessible through several different switch systems (not shown in FIG. 11). Referring to FIG. 11, during a read operation, an address signal is placed on the bus. The address is received through address register 112 and is provided to each of these distinct memories. It should he appreciated that FIG. 11 shows only a single switch system 98 that provides access to a single one of these memories. As explained below, there may be other similar switch systems connected to provide access to other memories. The address signal is used to retrieve distinct burst subsets from the distinct memories in which they are stored. Burst subsets stored in the memory accessed through switch system 98 are presented by that memory to the i/o driver 110 which transfers such subsets, via one or more of the multibit lines d0, d1, d2 and d3, to the transfer buffer 106 for temporary storage. The buffer 106, in turn, presents those subsets to the configurable switch 104 via one or more of the multibit lines c0, c1, c2 and c3. The configurable switch 104 can be configured to provide them directly to one or more of the multibit lines b0, b1, b2 and b3 connected to the bus interface register 102. The subsets that are not stored in the memory accessed through the switch system 98 are transferred to the switch system 98 via one or more of the multibit slave interconnects labeled s0, s1 and s2 of port1, port2 or port3, respectively. More particularly, those subsets stored in other memories are first retrieved from those memories and then are transferred to one or more of the slave interconnects of the switch system 98. The retrieval of subsets from these other memories shall be discussed below in connection with exemplary two MIU and four MIU systems. The configurable switch 104 can be configured to transfer subsets provided on its slave interconnects to one or more of the multibit lines b0, b1, b2 and b3, to the register 102.

Figure 13:
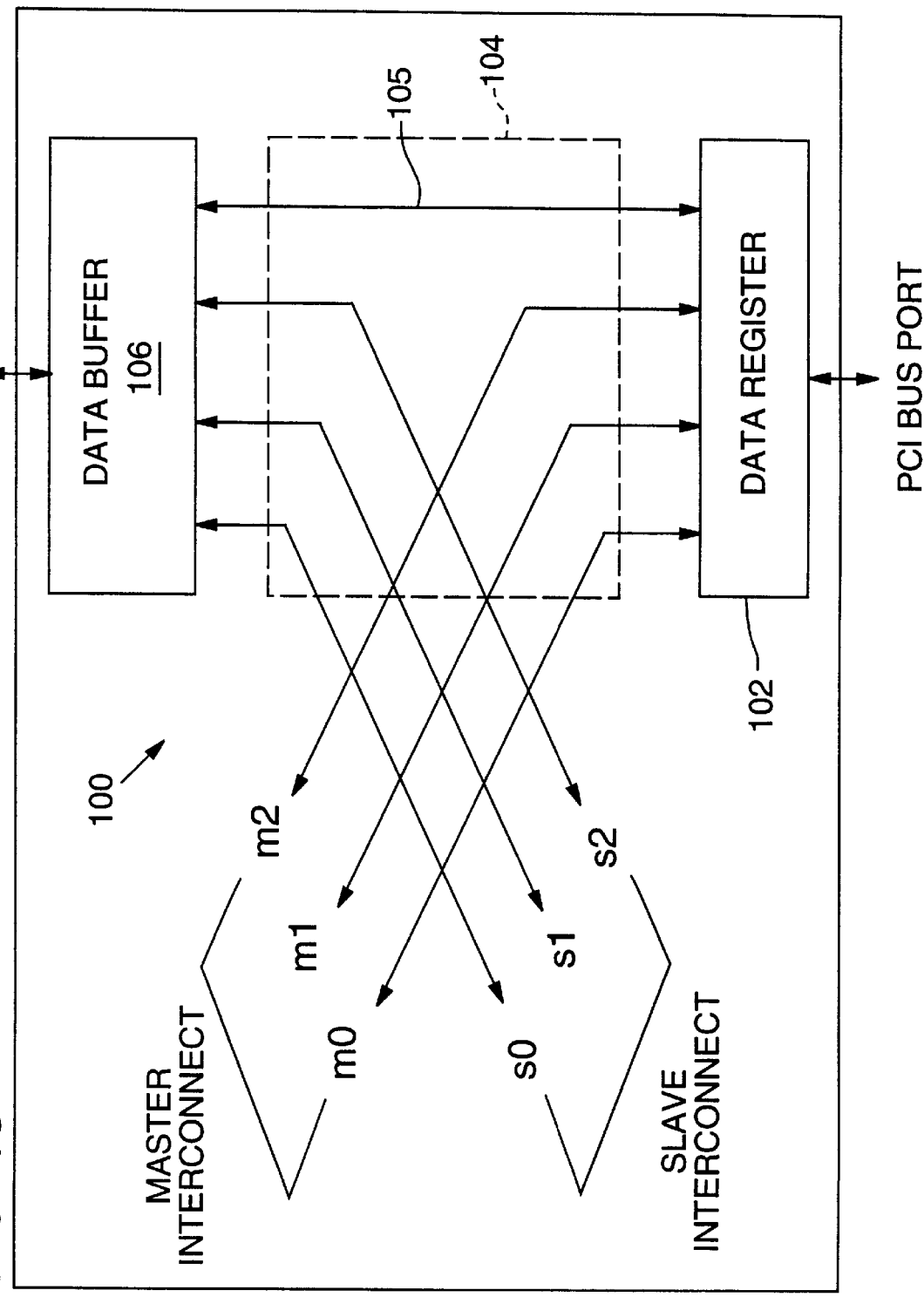
FIG. 13 is a simplified block diagram showing one possible configuration of the configurable switch of the switch system of FIG. 11.

FIG. 13 is a simplified block diagram of the bus interface register 102, the configurable switch 104 and the transfer buffer 106 of FIG. 11 showing one possible configuration of a switch 104 in accordance with a current embodiment of the invention. The switch 104 (indicated within dashed lines) is configured to transfer burst subsets between the buffer 106 and register 102 via a "direct" interconnect path 105. Master interconnects m0, m1 and m2 provide paths for the transfer of burst subsets to and from the register 102. Slave interconnects s0, s1 and s2 provide paths for the transfer of burst subsets to and from the transfer buffer 106.

Still referring to FIG. 13, during a memory write operation, for example, a burst is received by the bus interface register 102. A first burst subset is transferred via the direct path 105 to the buffer 106. A second burst subset is transferred away from the register 102 via master path m0. A third burst subset is transferred away from the register via master path m1. A fourth burst subset is transferred away from the register via master path m2. Thus, the first burst subset can be stored in a memory (not shown) connected to the buffer 106, and the second, third and fourth burst subsets can be stored elsewhere, in memories accessed via paths m0, m1 and m2.

Conversely, during a memory read operation, for example, a first burst subset initially is stored in a memory (not shown) connected to the buffer 106, and second, third and fourth burst subsets are stored elsewhere in different digital memories (not shown). The transfer buffer 106 can temporarily store the first subset when it is retrieved from the memory connected to that buffer 106. The buffer then transfers the first subset to the register via the direct path 105. A second burst subset is received via slave path s0. A third burst subset is received via slave path s1. A fourth subset is received via slave path s2. Thus, the burst subsets which had been dispersed among different memories are gathered at the register 102 for transmission onto a bus.

Note that the configuration in FIG. 13 represents only one possible configuration of the switch 104. For example, the switch might instead be configured to provide multiple direct paths between the bus interface logic 116 and the buffer 106. The discussion below in connection with a two MIU system 120 and a four MIU system 106 explains a few exemplary alternative switch configurations.

Figure 14A:
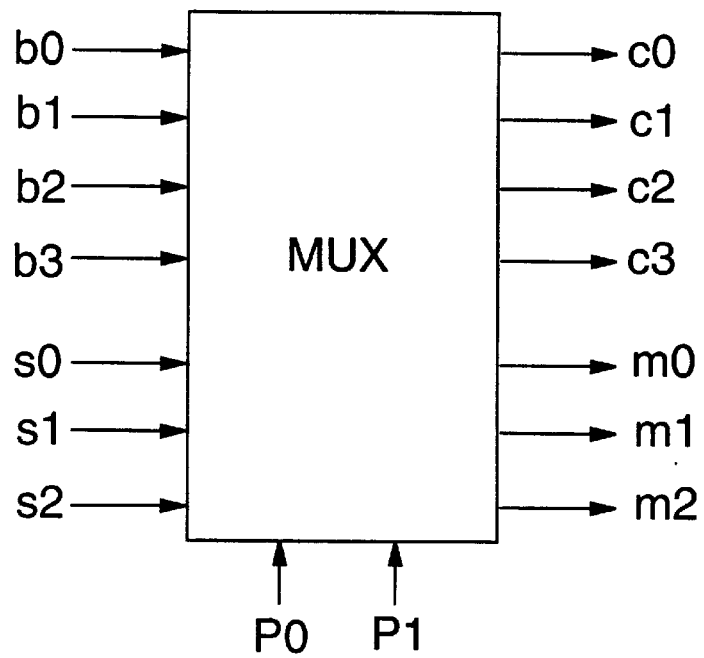
FIG. 14A is a block diagram showing signal lines and control lines of the configurable switch of the embodiment of FIG. 11.
Figure 14B:
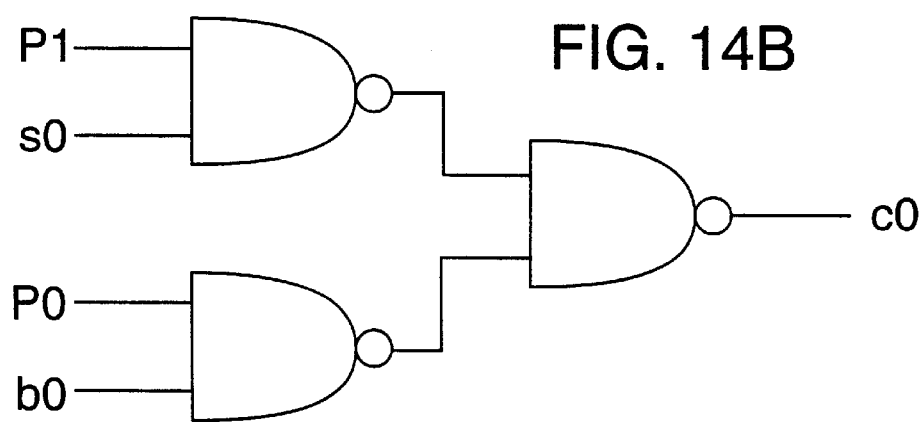
FIG. 14B is a gate level logic diagram showing the logic gates within the configurable switch of FIG. 14A used to produce c0 during a memory write for a two MIU implementation.
Figure 14C:
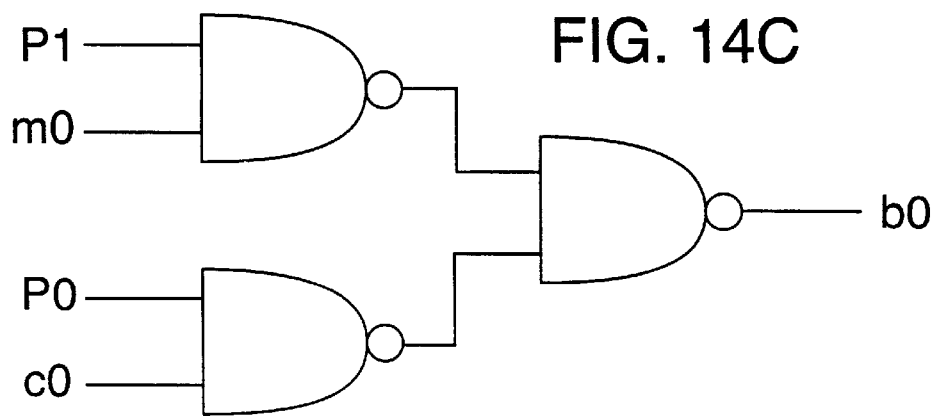
FIG. 14C is a gate level logic diagram showing the logic gates within the configurable switch of FIG. 14A used to produce d0 during a memory read for a two MIU implementation.

Referring to FIG. 14A, there is shown a block diagram of a configurable switch 104 of a currently preferred embodiment which illustrates many of the signal lines of the switch 104. The switch is implemented as a multiplexer in a manner that will be readily appreciated by one of ordinary skill in the art. By way of example, FIG. 14B is a gate level logic diagram that illustrates the internal logic responsible for producing the c0 output during a "read" operation by a two MIU implementation described below. FIG. 14C is a gate level logic diagram that illustrates the internal logic responsible for producing the b0 output during a "write" operation by a two MIU implementation described below. In the two MIU implementation, the P0 input, for example, may designate the right side MIU, and P1 may designate the left side MIU.

The following equations represent the complete functionality of the configurable switch (multiplexer) 104 during a write for the two MIU implementation.

$c0 = P1 \cdot s0 + P0 \cdot b0$ $c1 = P0 \cdot s0 + P1 \cdot b1$ $c2 = P1 \cdot s2 + P0 \cdot b2$ $$c3 = P0 \cdot s2 + P1 \cdot b3$$

$$m0 = P1 \cdot b0 + P0 \cdot b1$$

$$m2 = P1 \cdot b2 + P0 \cdot b3$$

The following equations represent the complete functionality of the configurable switch (multiplexer) 104 during a read for the two MIU implementation.

$$b0 = P1 \cdot m0 + P0 \cdot c0$$

$$b1 = P0 \cdot m0 + P1 \cdot c1$$

$$b2 = P1 \cdot m2 + P0 \cdot c2$$

$$b3 = P0 \cdot m2 + P1 \cdot c3$$

$$s0 = P1 \cdot c0 + P0 \cdot c1$$

$$s2 = P1 \cdot c2 + P0 \cdot c3$$

It will be appreciated that in the four MIU implementation described below, there are four different logical values P0, P1, P2 and P3 that may be used to distinguish the four different MIUs. However, the basic multiplexing techniques and logic circuitry used to switch signals among the four MIUs are well known to those skilled in the art and need not be described further herein.

Figure 15:
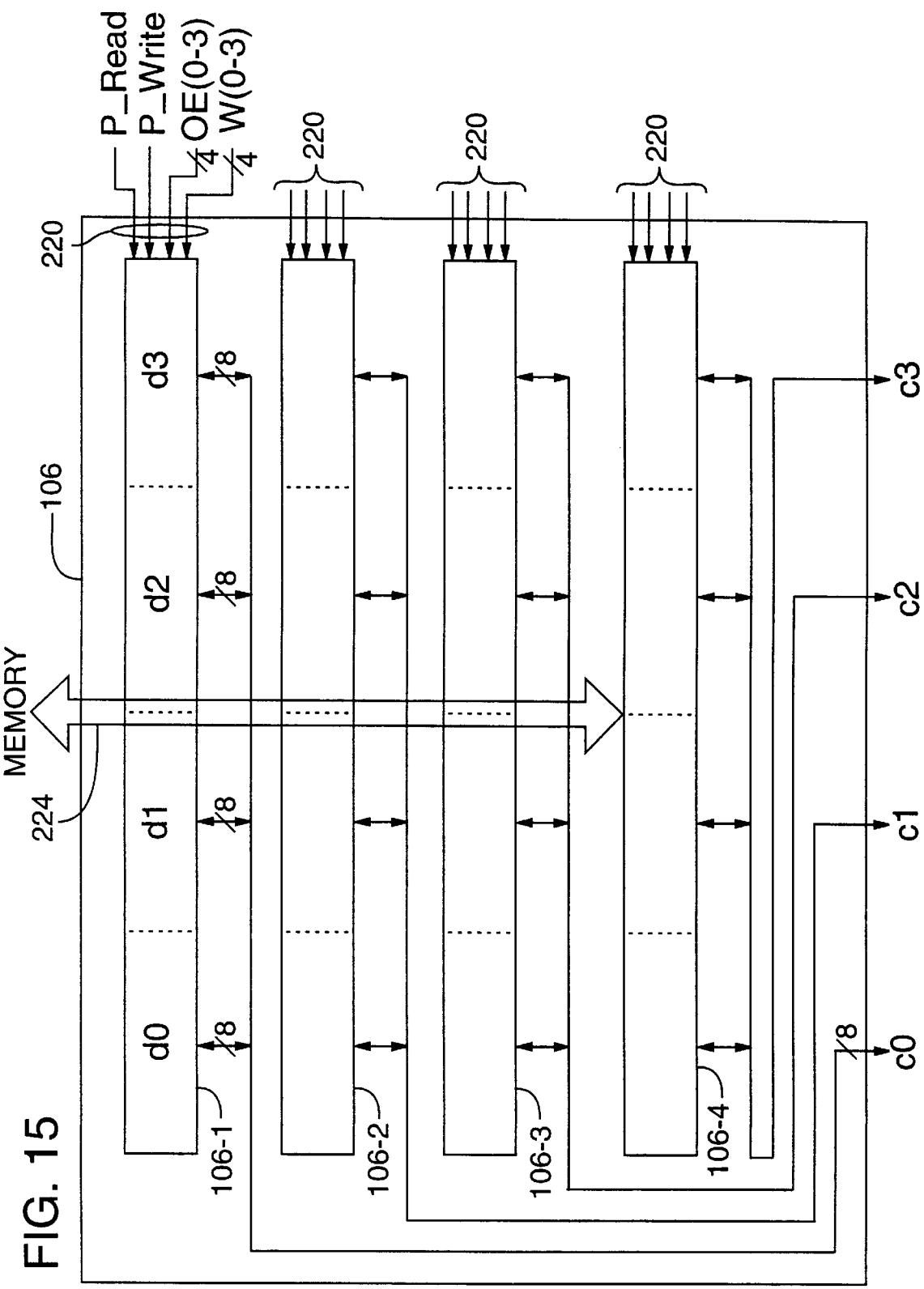
FIG. 15 is an illustrative block diagram showing details of a transfer buffer of the embodiment of FIG. 11.

The illustrative drawing of FIG. 15 shows additional details of the transfer buffer 106 of FIG. 11. In a presently preferred embodiment, the buffer 106 includes four memory access buffers 106-1, 106-2, 106-3 and 106-4. The memory access buffers receive respective P_READ, P_WRITE, OE(0–3) and W(0–3) control signals. The configurable switch 104 accesses memory access buffers which are accessible via byte-wide input/output lines c0, c1, c2 and c3. In a current implementation each serial line is one byte wide. However, different sized multibit fragments of a burst subset are possible. The memory (not shown) is accessed through the memory access buffers via lines d0, d1, d2 and d3, over an 32-bit memory bus 224.

The memory bus 224 transfers digital information between individual memory access buffers and a digital memory (not shown) connected to the buffer 106. During a memory write, for example, a burst subset might be transferred in parallel (all at once) from memory access buffer 106-1 to the memory via bus 224. During a memory read, for instance, the burst subset might be transferred in parallel (all at once) from the memory to memory access buffer 106-1 via the bus 224.

Figure 16:
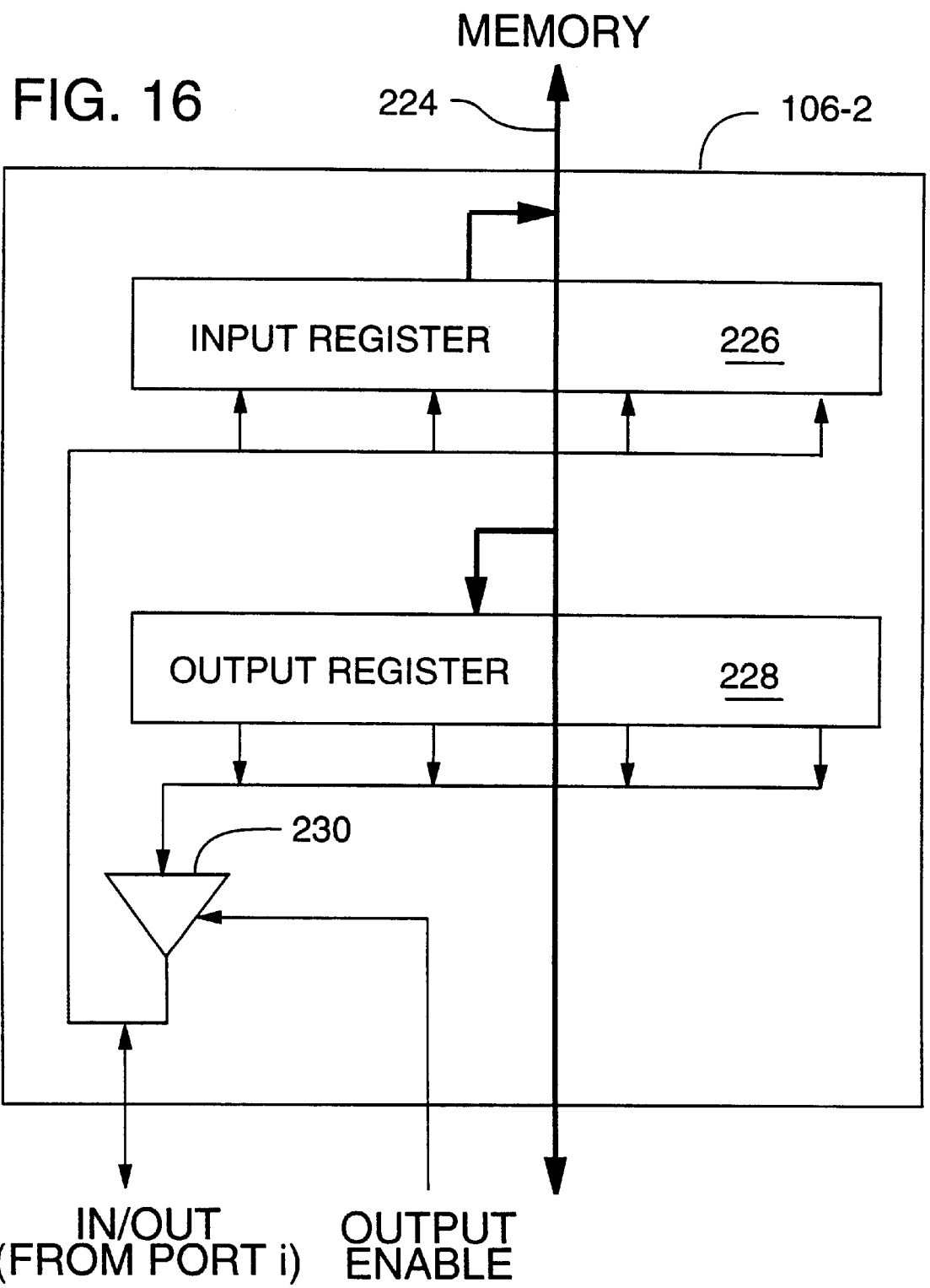
FIG. 16 is an illustrative block diagram showing details of an individual memory access buffer of the transfer buffer of FIG. 15.

Referring to the illustrative drawings of FIG. 16, there are shown details of an exemplary memory access buffer 106-2 in accordance with a current embodiment of the invention. A shift-in register 226 receives a series of byte-wide burst subset fragments on lines c1 until an entire burst subset is accumulated. The shift-in register can temporarily store the complete burst subset. The entire subset then is asserted in parallel (all byte-wide fragments at once) to the memory bus 224 so that the subset can be written in parallel to the digital memory.

A shift-out register 228 is employed during memory reads. An entire burst subset read from the memory is provided in parallel to the shift-out register 228 the memory bus 224. The shift-out register can temporarily store the entire burst subset. The register then can provide a series of byte-wide burst subset fragments on lines c1 until the entire burst subset has been delivered to the configurable switch 104. Output buffer 230 controls the provision of subset fragments from the shift-out register to lines c1.

It should be appreciated that in a current implementation of the invention, each individual switch system includes a control unit that issues control signals that control the operation of its associated transfer buffer. If there are multiple switch systems connected together as, for example in the two MIU configuration or the four MIU configuration, then coordination among the controllers of the different switch systems is required in order to achieve sharing of memory. This coordination can be achieved, for instance, by having each controller run an algorithm used to coordinate the multiple switch systems access to shared memory. There are several well known algorithms that can be employed. For example, requests for memory access by different switch systems can be handled according to a fixed priority among switches or according to a round-robin scheme.

Figure 17:
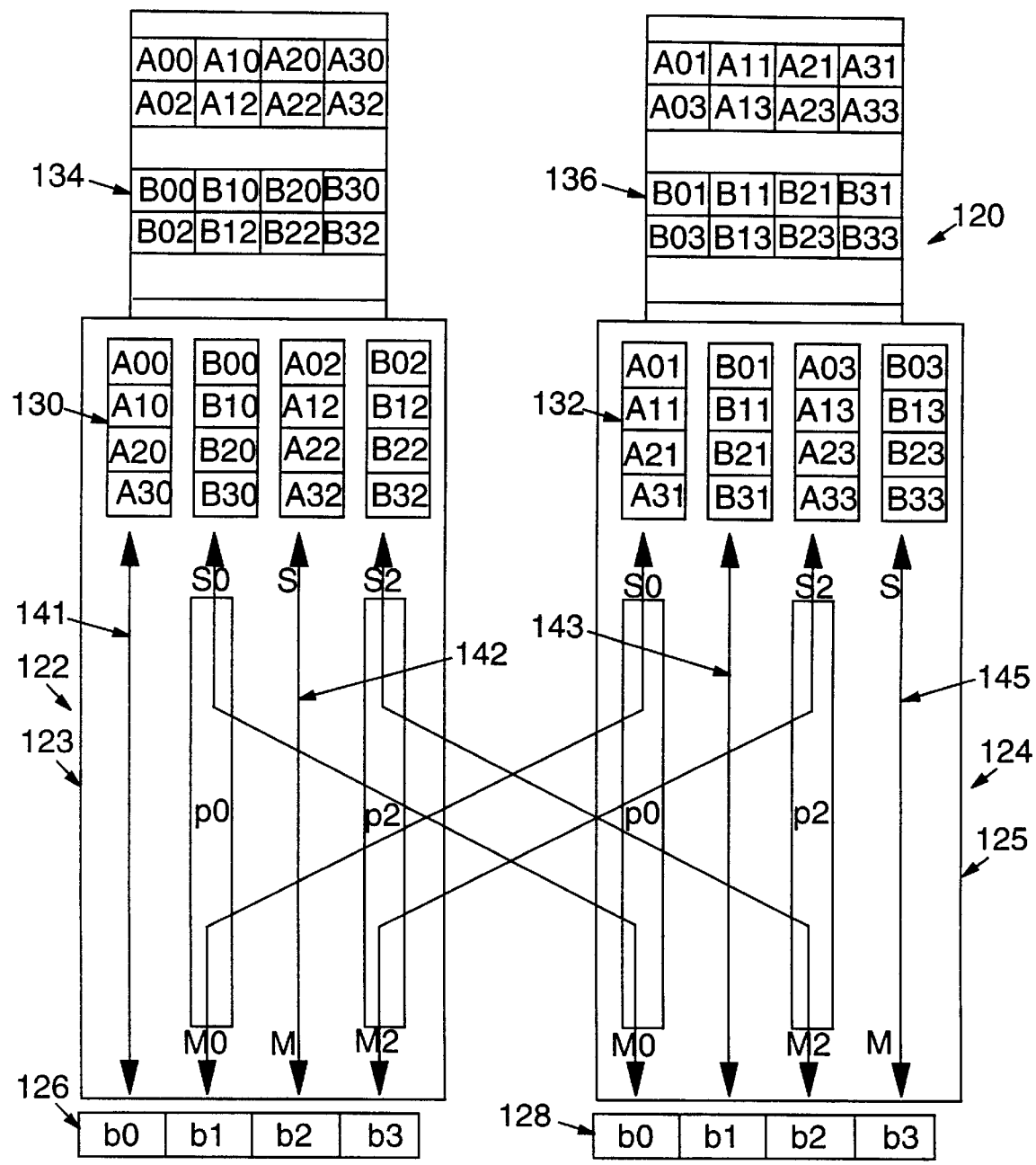
FIG. 17 is a block diagram of a two MIU system in accordance with a present embodiment of the invention.

FIG. 17 is an illustrative block diagram of a two MIU system 120 in accordance with a present embodiment of the invention. For simplicity sake, details such as the control logic and the bus interface logic are not shown. Two MIUs 122 and 124 are interconnected as shown. That is, the MIU switches 123 and 125 are configured so that m0 and s0 interconnects of MIU switch 123 and MIU switch 125 are connected to each other through their respective ports p0. Similarly, the m2 and s2 interconnects of MIU switch 123 and MIU switch 125 are connected to each other through their respective ports p2. Switch 123 is further configured to provide direct interconnects 141 and 142 between bus interface logic 126 and buffer 130. Switch 125 is further configured to provide direct interconnects 143 and 144 between bus interface logic 128 and buffer 132. Buffer 130 is connected to transfer burst subsets to and from digital memory 134. Buffer 132 is connected to transfer burst subsets to and from digital memory 136.

Figure 18:
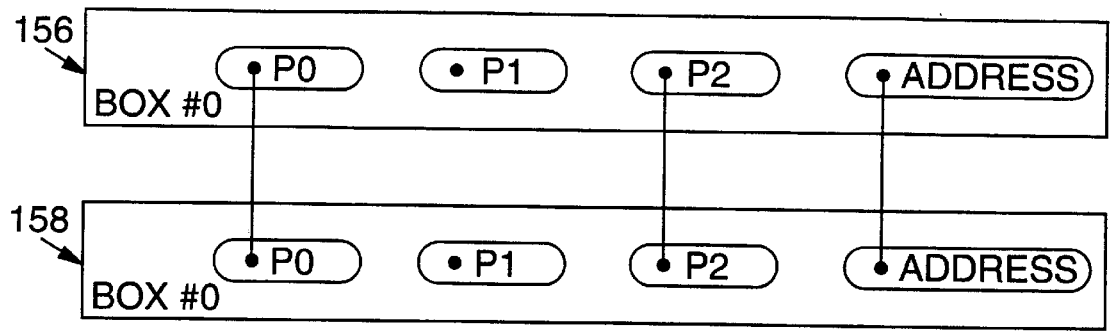
FIG. 18 is a side view of stacked boxes containing the two MIU system of FIG. 17 which illustrates port and address connections between the two MIUs.

FIG. 18 is a simplified side view of two stacked boxes 156 and 158 which together house the two MIU system 120. Box 156 houses MIU 122, memory 134 and bus interface logic 126. Box 158 houses MIU 124, memory 136 and bus interface logic 128. Each box 156 and 158 has three ports p0, p1, and p3. Each box also has a shared address bus over which it can share address information with a neighboring box or boxes. The ports p0 and the ports p2 and the shared address bus are connected as shown.

FIG. 19 is a matrix that represents the interconnections among the two MIUs 122 and 124 of the two MIU system of FIG. 17. A "0" at a line intersection indicates an interconnection within MIU switch 123. A "1" at a line intersection indicates an interconnection within MIU switch 125. The upper left quadrant represents connections between slave lines s0, s1, and s2 and bus interface logic lines b0, b1, b2 and b3. The lower right quadrant represents connections between master lines m0, m1 and m2 and MIU buffer lines c0, c1, c2 and c3. The lower left quadrant represents connections between bus interface logic lines b0, b1, b2 and b3 and MIU buffer lines c0, c1, c2 and c3. The interconnections for MIU switch 123 are as follows: b0 directly connected to c0; b1 connected to m0; b2 directly connected to c2; b3 connected to m2; c1 connected to s0; and c3 connected to s2. The interconnections for MIU switch 125 are as follows: b0 connected to m0; b1 connected directly to c1; b2 connected to m2; b3 connected directly to c3; c0 connected to s0; and c2 connected to s2.

In operation, bursts are transferred between the MIUs 122 and 124 and an external bus (not shown) via bus interface logic units 126 and 128. For simplicity sake, the address and data registers connected to an external bus are shown to be amalgamated into bus interface logic units. An entire exemplary four word burst 127 transferred through logic 126 is shown. The burst 127 includes the digital word identified as containing multibit fragments A00, A01 A02 and A03. In a current embodiment of the invention, each fragment includes multiple logical bits. However, the invention may be implemented using single bit fragments as an alternative. The burst subset which includes A00, A10, A20 and A30 and the burst subset which includes A02, A12, A12 and A32 are transferred between the bus interface logic 126 and the buffer 130 via direct interconnects 141 and 142. The burst subset which includes A01, A11, A21 and A31 is transferred between the bus interface logic 126 and the buffer 132 via the port p0 interconnects of the switches 123 and 125. The burst subset which includes A03, A13, A23 and A33is transferred between the bus interface logic 126 and the buffer 132 via the port p2 interconnects of the switches 123 and 125.

Similarly, an entire exemplary four word burst 129 transferred through logic 128 is shown. The burst includes the digital word identified as containing multibit fragments B00, B01, B02 and B03. The burst subset which includes B00, B10, B20 and B30 and the burst subset which includes B02, B12, B12 and B32 are transferred between the bus interface logic 128 and the buffer 132 via direct interconnects 143 and 145. The burst subset which includes B01, B11, B21 and B31 is transferred between the bus interface logic 128 and the buffer 130 via the port p0 interconnects of the switches 123 and 125. The burst subset which includes B03, B13, B23 and B33 is transferred between the bus interface logic 128 and the buffer 130 via the port p2 interconnects of the switches 123 and 125.

Two subsets from the burst 127 transferred though bus interface logic 126 and two subsets from the burst 129 transferred through bus interface logic 128 can be temporarily stored in each of the two buffers 130 and 132 as shown. Likewise, the two subsets from each of the bursts are stored in digital memory 134, and two subsets from each of the two bursts are stored in digital memory 136 as shown. Hence, the contents of any burst transferred through either bus interface logic units 126 or 128 are distributed among and temporarily stored in the two different digital memories. In a current embodiment, SRAM is employed. However, other memory architectures such as DRAM could be used consistent with the invention.

Figure 20:
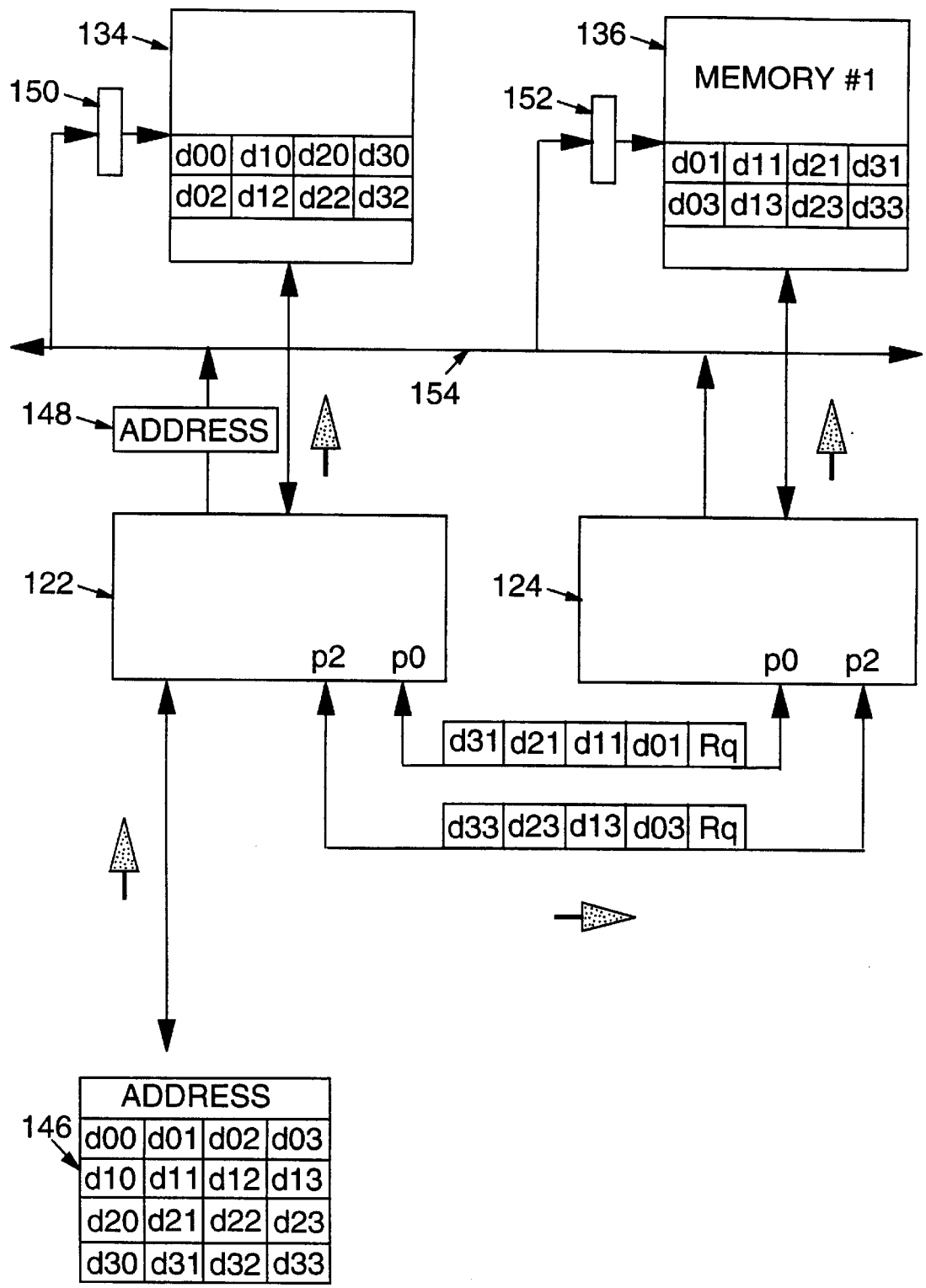
FIG. 20 is a simplified block diagram of the two MIU system of FIG. 17 illustrating the flow of burst subsets during a memory write operation.

FIG. 20 illustrates the flow of burst subsets through the two MIU system 120 of FIG. 17 during a representative memory write operation. A five word burst 146 is received by the bus interface logic (not shown). The first word of the burst contains address information. The next four words contain digital information to be written to digital memories 134 and 136. The address information is transferred by MIU 122 to an MIU address register 148. The MIU address register 148 presents the burst address to memory address registers 150 and 152 of digital memories 134 and 136 via connection 154. Burst subset d00, d10, d20 and d30 and burst subset d02, d2, d22 and d32 are transferred by MIU 122 to digital memory 134 for storage at an address location designated by memory address register 150. Burst subset d31, d21, d11 and d01 is transferred from MIU 122 to MIU 124 via their respective port p0 interconnects, and then is transferred by MIU 124 to digital memory 136 for storage at a memory location designated by memory address register 152. Likewise, burst subset d33, d23, d13 and d03 is transferred from MUW 122 to MIU 124 via their respective port p2 interconnects, and then is transferred by MIU 124 to digital memory 136 for storage at a memory location designated by memory address register 152. Each of the burst subsets transferred from MIU 122 to MIU 124 is preceded by a Rq signal, which indicates whether there is to be a read or a write.

Figure 21:
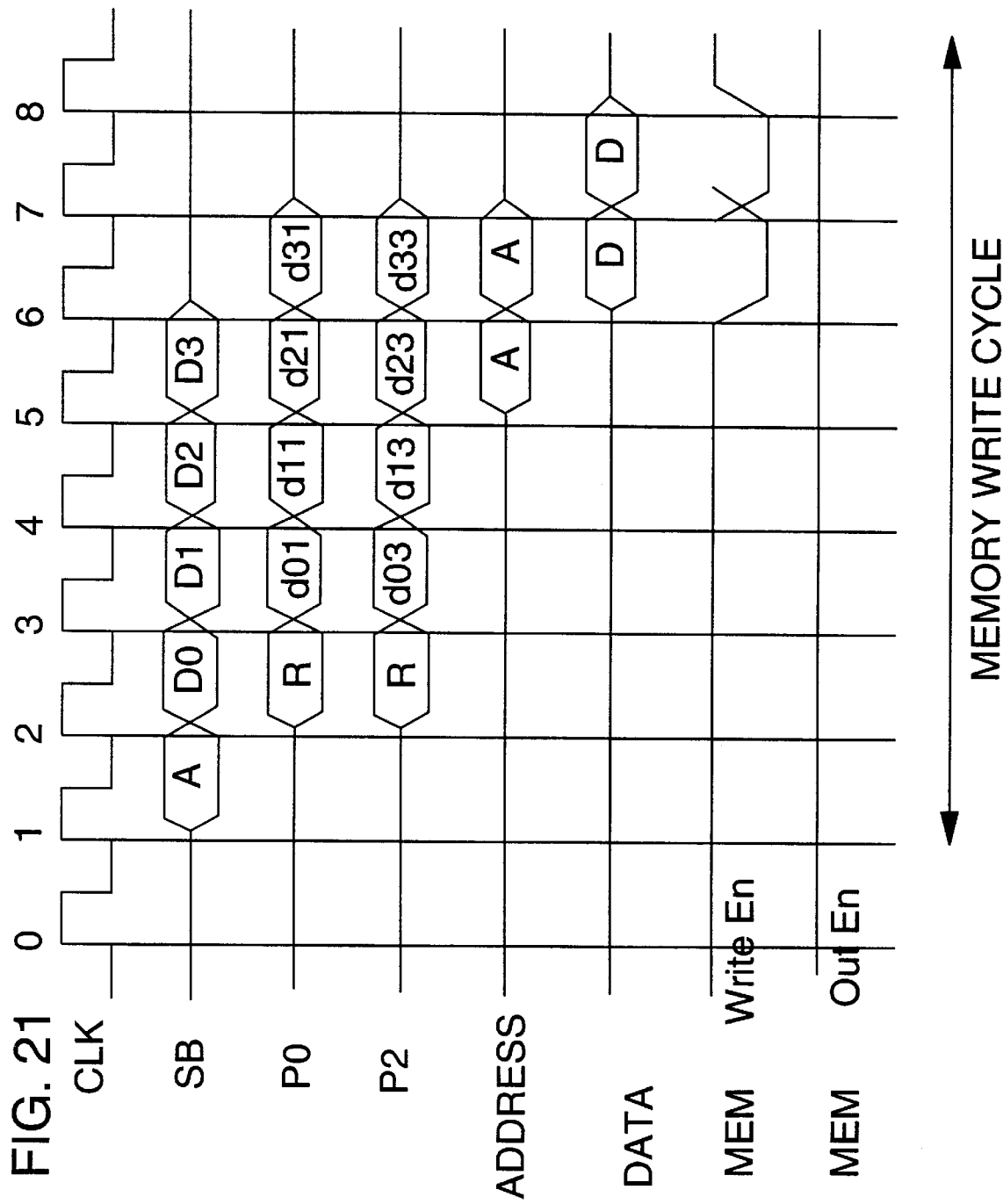
FIG. 21 is a timing diagram which illustrates the timing of data and control signals during a memory write operation for the two MIU system of FIG. 17.

FIG. 21 is a timing diagram which illustrates the timing of data and control signals in connection with the memory write operation of FIG. 17 for the two M system 120 of FIG. 17. During clock cycles 1–2, an address is received from the bus. During clock cycles 2–3, data word D0 is received from the segment bus; and the Rq signals are sent over the p0 and p2 interconnects to MIU 124. During clock cycles 3–4, data word D1 is received from the segment bus, and burst subset fragments d01 and d03 are transferred to MIU 124 over the multibit master interconnects of ports p0 and p2 respectively. During clock cycles 4–5, data word D2 is received from the segment bus, and burst subset fragments d11 and d13 are transferred to MIU 124 over the multibit master interconnects of ports p0 and p2 respectively. During clock cycles 5–6, data word D3 is received from the segment bus, and burst subset fragments d21 and d23 are transferred to MIU 124 over the multibit master interconnects of ports p0 and p2 respectively. During clock cycles 6–7, burst subset fragments d31 and d33 are transferred to MIU 124 over the multibit master interconnects of ports p0 and p2 respectively. Also, during clock cycles 5–7, a memory address associated with the burst in registers 150 and 154 is presented to each of the digital memories 134 and 136. During clock cycles 6–8, a memory write enable signal is asserted simultaneously by two control units that control the two MIUs, and the entire data burst subsets stored in the transfer buffers 130 and 132 are written in parallel to the respective digital memories 134 and 136.

Figure 22:
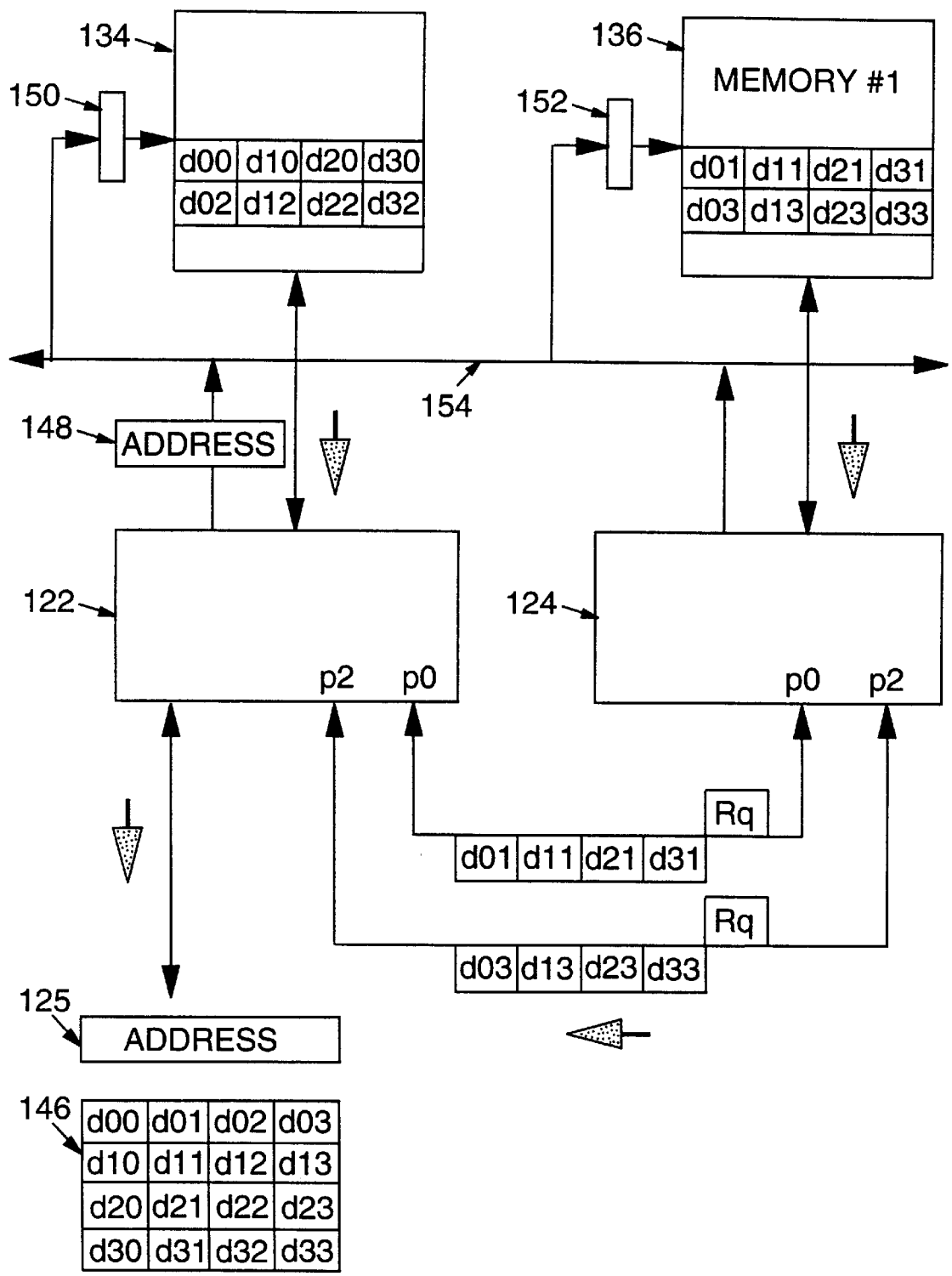
FIG. 22 is a simplified block diagram of the two MIU system of FIG. 17 illustrating the flow of subsets during a memory read operation.

FIG. 22 illustrates the flow of burst subsets through the two MIU system 120 of FIG. 17 during a representative memory read operation. Initially, the four words of a burst are distributed across two different digital memories 134 and 136. A memory address 125 is provided to MIU address buffer 148 which presents the address via the connection 154 to memory address registers 150 and 152. Digital memory 134 provides the burst subset d00, d10, d20 and d30 to MIU 122 which transfers it directly to the bus interface logic 126. Digital memory 134 also provides the burst subset d02, d12, d22 and d32 to MIU 122 which transfers it directly to the bus interface logic (not shown). Digital memory 136 transfers burst subset d01, d11, d21 and d31 to MIU 124 which transfers it to MIU 122 via their port p0 interconnects. MIU 122 then transfers the subset to its bus interface logic. Similarly, digital memory 136 transfers burst subset d03, d13, d23 and d33 to MIU 124 which transfers it to MIU 122 via their port p2 interconnects. MIU 122 then transfers the subset to its bus interface logic. Thus, the burst 146 is retrieved from different memories and is made available at the bus interface logic.

Figure 23:
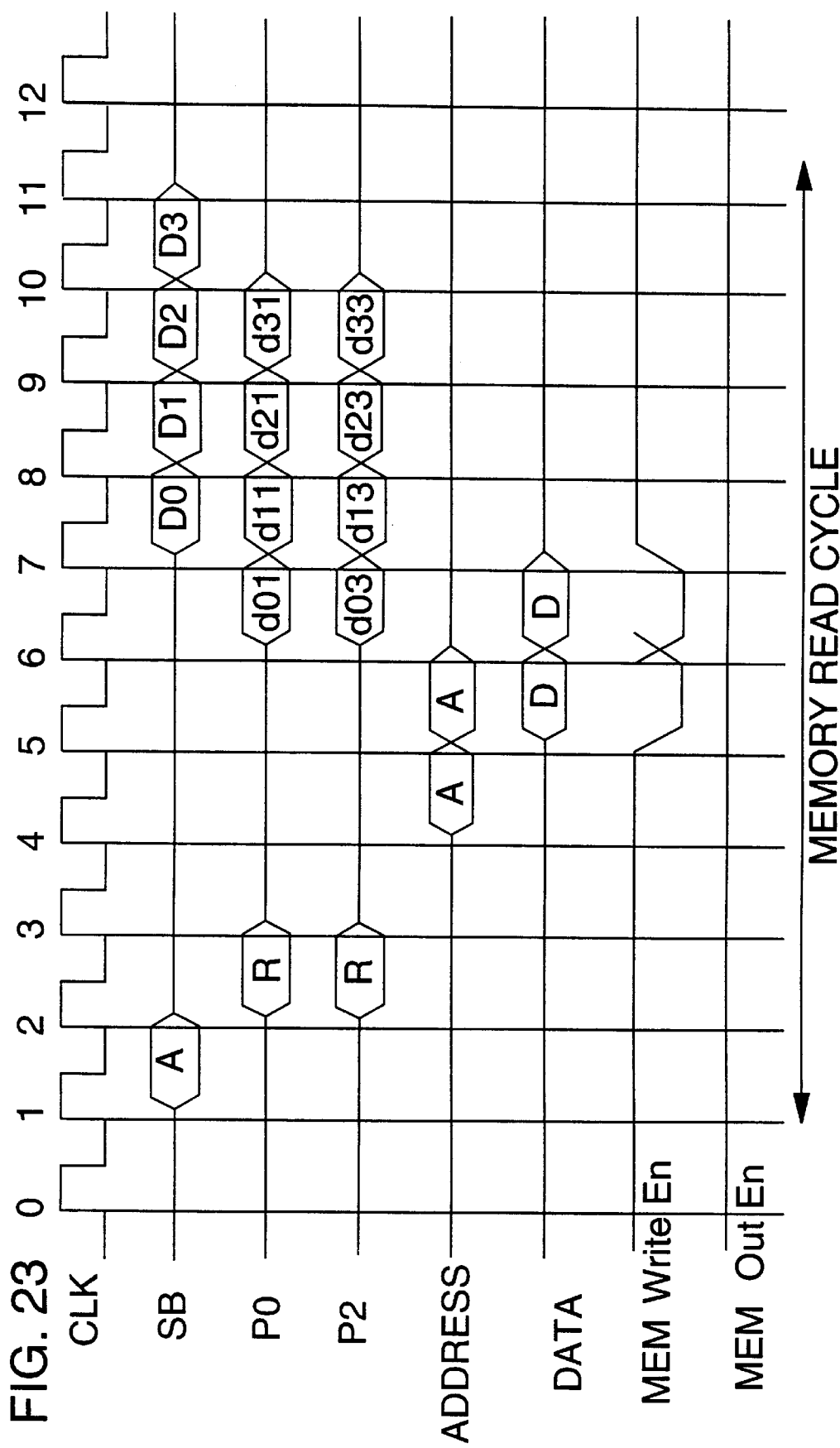
FIG. 23 is a timing diagram which illustrates the timing of data and control signals in connection with a read operation for the two MIU system of FIG. 17.
Figure 24:
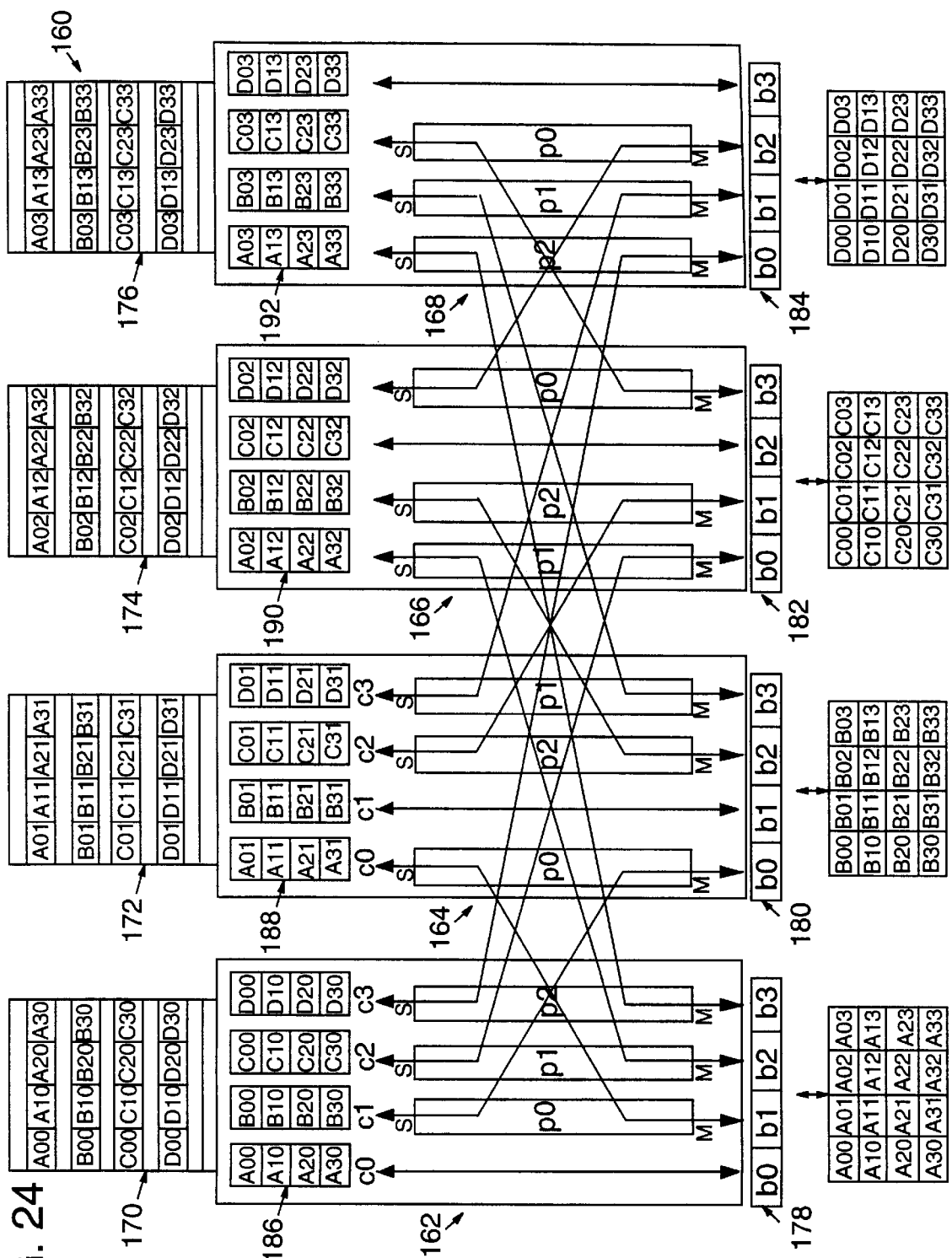
FIG. 24 is a simplified block diagram of a four MIU system in accordance with a present embodiment of the invention.

FIG. 23 is a timing diagram which illustrates the timing of data and control signals in connection with the memory read operation of FIG. 22 for the two MIU system 120 of FIG. 17. During clock cycles 1–2, an address signal is received from the segment bus. During clock cycles 2–3, Rq signals produced by the bus interface logic are sent over the p0 and p2 interconnects of MIU 124. During clock cycles 4–6, a memory address in each of memory address registers 150 and 152 is presented to memories 134 and 136. During clock cycles 5–7, a memory output enable signal is provided to each of the memories, and entire data burst subsets are read in parallel from each of the two memories 134 and 136 and are presented to transfer buffers 130 and 132 for temporary storage. During clock cycles 6–7, fragments d01 and d03 are transferred to MIU 122 over the slave interconnects of ports p0 and p2 respectively. During clock cycles 7–8, fragments d11 and d13 are transferred to MIU 122 over the slave interconnects of ports p0 and p2 respectively, and data word DO is presented to the segment bus. During clock cycles 8–9, fragments d21 and d23 are transferred to MIU 122 over the slave interconnects of ports p0 and p2 respectively, and data word D1 is presented to the segment bus. During clock cycles 9–10, fragments d31 and d33 are transferred to MIU 122 over the slave interconnects of ports p0 aud p2 respectively, and data word D2 is presented to the segment bus. During clock cycles 10–11, data word D3 is presented to the segment bus. FIG. 24 is a simplified block diagram of a four MIU system 160 in accordance with a presently preferred embodiment of the invention. Control logic and bus interface logic details are omitted to simplify the following explanation. The system 160 includes four MIUs 162, 164, 166 and 168. Each MIU includes a configurable matrix of electrical interconnect lines. Every MIU includes three ports, p0, p1 and p2. Each MIU also includes a buffer section 186, 188, 190 and 192. Each of the four MIUs is connected to a different one of four digital memories 170, 172, 174 and 176. Each of the four MIUs also is connected to a different one of four bus interface logic units 178, 180, 182 and 184.

Figure 25:
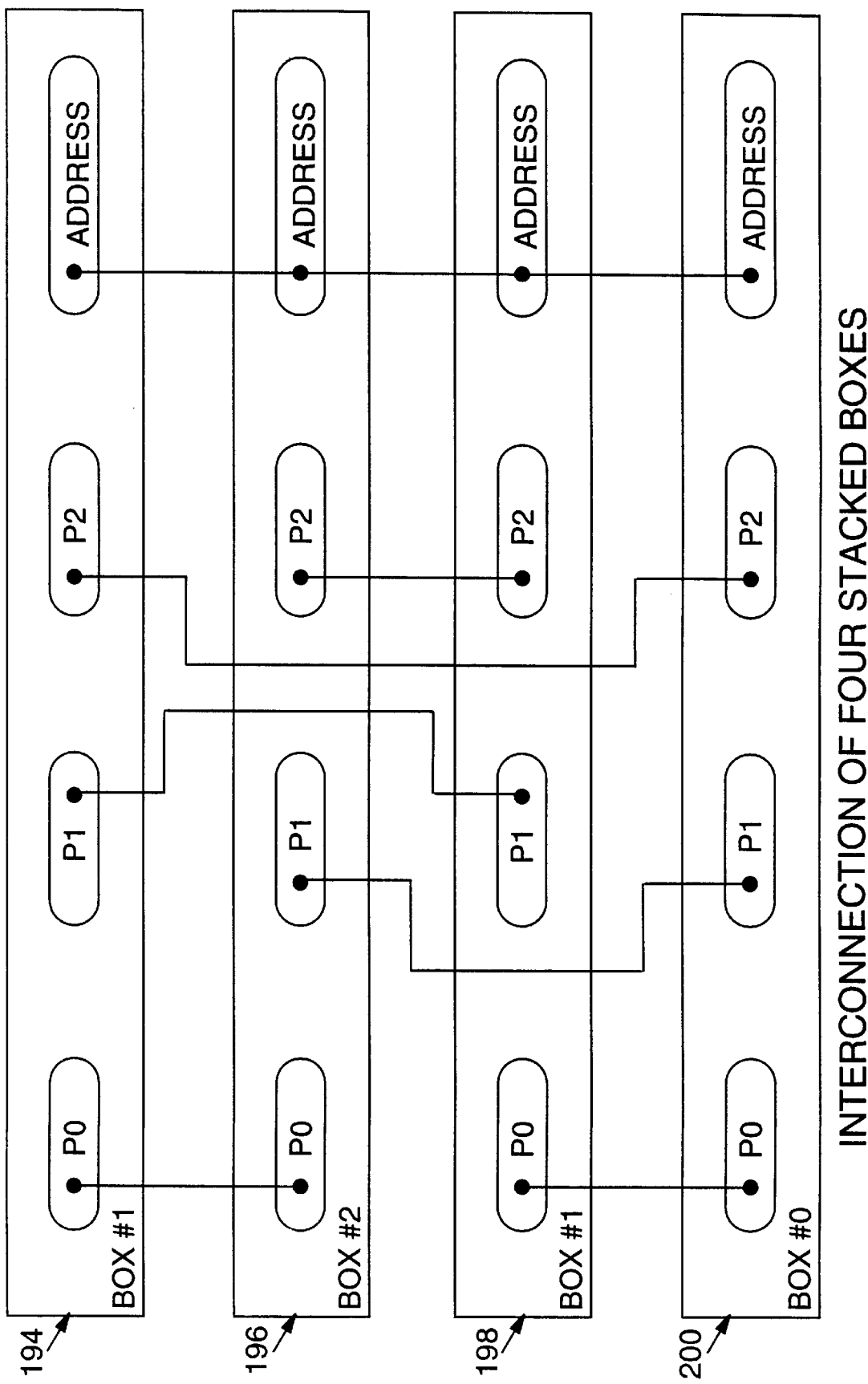
FIG. 25 is a side view of stacked boxes containing the four MIU system of FIG. 24 which illustrates port and address connections between the MIUs.

FIG. 25 is a side view of four stacked boxes 194, 196, 198 and 200 which together house the four MIU system 160 of FIG. 23. Box 194 houses MIU 162, memory 170 and bus interface logic 178. Box 196 houses MIU 164, memory 172 and bus interface logic 180. Box 198 houses MIU 166, memory 174 and bus interface logic 182. Box 200 houses MIU 168, memory 176 and bus interface logic 184. Each box has three ports p0, p1, and p2. Each box also has an address bus over which it can share address information with a neighboring box. The ports and the address buses are connected as shown.

For example, the port p1 interconnects of MIU 162 in box 194 and MIU 166 in box 198 are coupled to transfer burst subsets between the two MIUs. Specifically, for example, the port p1 master interconnect of MIU 162 is coupled to the port p1 slave interconnect of MIU 166. Conversely, the port p1 slave interconnect of MIU 162 is coupled to the port p1 master interconnect of MIU 166. In operation, the burst segment A02, A12, A22, A32 is transmitted between bus interface logic 178 and digital memory 174 via the port p1 master interconnect of MIU 162 and the port p1 slave interconnect of MIU 166. Also, in operation, the burst segment C00, C10, C20, C30 is transmitted between bus interface logic 182 and digital memory 170 via the port p1 slave interconnect of MIU 162 and the port p1 master interconnect of MIU 166.

FIG. 26 is a matrix that represents the interconnections among the four MIUs 162, 164, 166 and 168 of the four MIU system 160 of FIG. 24. A "0" at a line intersection indicates an interconnection within MIU switch 162. A "1" at a line intersection indicates an interconnection within MIU switch 164. A "2" at a line intersection indicates an interconnection within MIU switch 166. A "3" at a line intersection indicates an interconnection within MIU 168. For example, the interconnections for MIU switch 162 are as follows: b0 connected directly to c0; c1 connected to s0; c2 connected to s1; c3 connected to s2; b1 connected to m0; b2 connected to m1; and b3 connected to m2. The interconnections for MIU switch 166, for example, are as follows: b0 connected to m2; b1 connected to m1; b2 connected to m0; b3 connected directly to c3; c0 connected to s2; c1 connected to s1; and c2 connected to s0. The interconnections of MIUs 164 and 168 will be readily appreciated from the matrix of FIG. 22 and the above discussion.

The operation of the four MIU system 160 of FIG. 24 in transferring burst subsets can be appreciated by observing the bursts transferred through bus interface logic 178, 180, 182 and 184; by observing the distribution of burst subsets among buffers 186, 188, 190 and 192; and by observing the storage of burst subsets in digital memories 170, 172, 174 and 176. For example, referring to digital memory 172, subset A01, A11, A21, A31 is transferred through bus interface logic 178 as part of a four word burst. Subset B01, B11, B21, B31 is transferred through bus interface logic 180 as part of a four word burst. Subset C01, C11, C21, C31 is transferred through bus interface logic 182 as part of a four word burst. Subset D01, D11, D21, D31 is transferred through bus interface logic 184 as part of a four word burst. In the course of a transfer of any one of these four burst subsets between digital memory 172 and a respective bus interface logic unit, the subset is temporarily stored in buffer 188.

Figure 27:
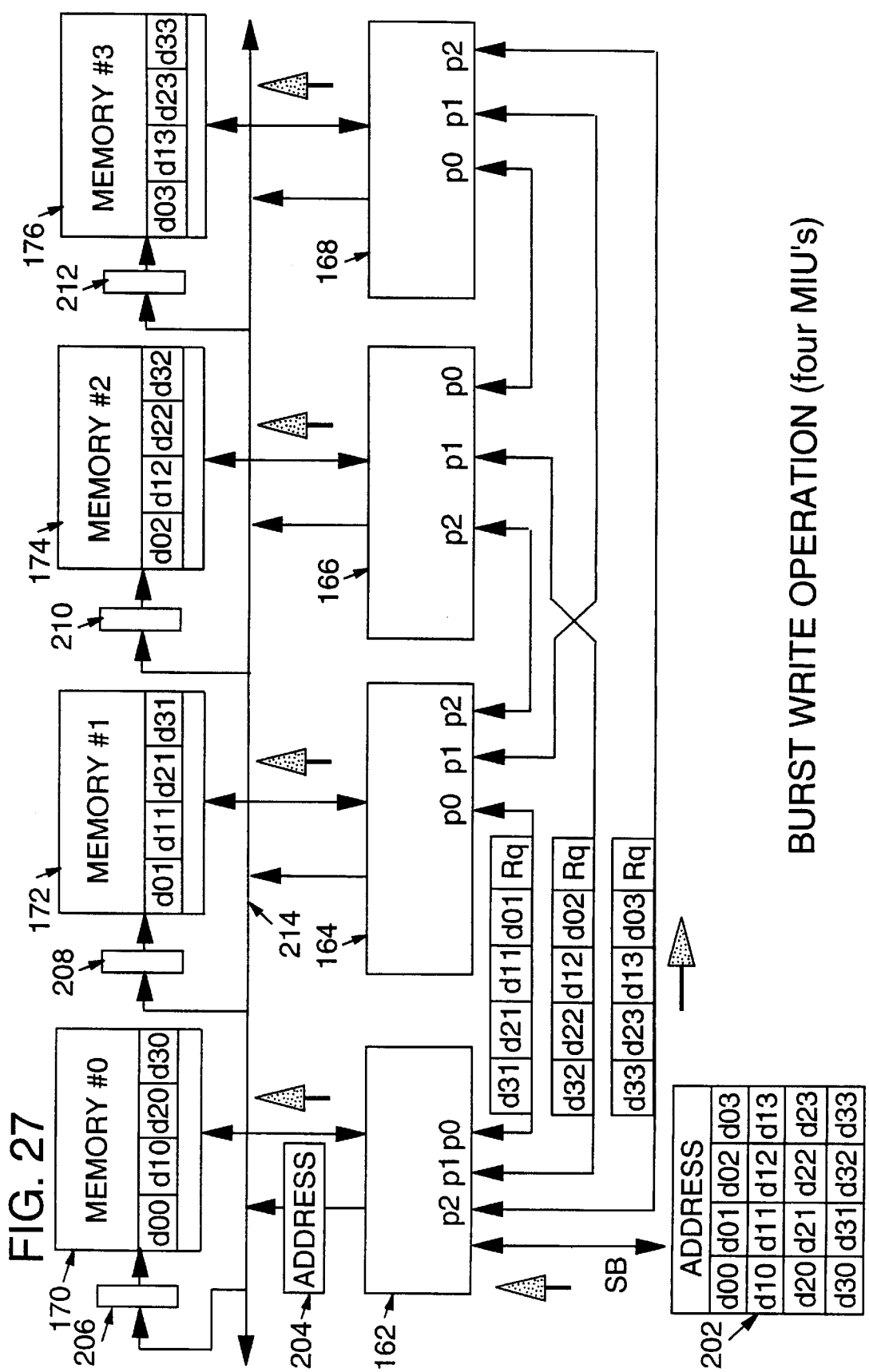
FIG. 27 is a simplified block diagram illustrating the flow of burst subsets within the four MIU system of FIG. 24 during a read operation.

FIG. 27 illustrates the flow of burst subsets through the four MIU system 160 of FIG. 24 during a representative memory write operation. A five word burst is received by bus interface logic associated with MIU 162. The first word of the burst contains address information. The next four words are slated to be distributed among digital memories 170, 172, 174 and 176. The address information is transferred by MIU 162 to an MIU address register 204. The MIU address register 204 presents the address to memory address registers 206, 208 210 and 212 of digital memories 172, 174, 176 and 178 via bus 214. Burst subset d00, d10, d20 and d30 is transferred by MIU 162 directly to digital memory 170 for storage at an address location designated by memory address register 206. Burst subset d31, d21, d11 and d01 is transferred from MIU 162 to MIU 164 via their respective port p0 interconnects, and then is transferred by MIU 164 to digital memory 172 for storage at a memory location designated by memory address register 208. Burst subset d02, d2, d22 and d32 is transferred from MIU 162 to MIU 166 via their respective port p1 interconnects, and then is transferred by MIU 166 to digital memory 174 for storage at a memory location designated by memory address register 210. Burst subset d33, d23, d13 and d03 is transferred from MIU 162 to MIU 168 via their respective port p2 interconnects, and then is transferred by MIU 168 to digital memory 176 for storage at a memory location designated by memory address register 212. Each of the burst subsets transferred among MIUs is preceded by a Rq signal which indicates whether there is to be a memory read or a memory write.

Figure 28:
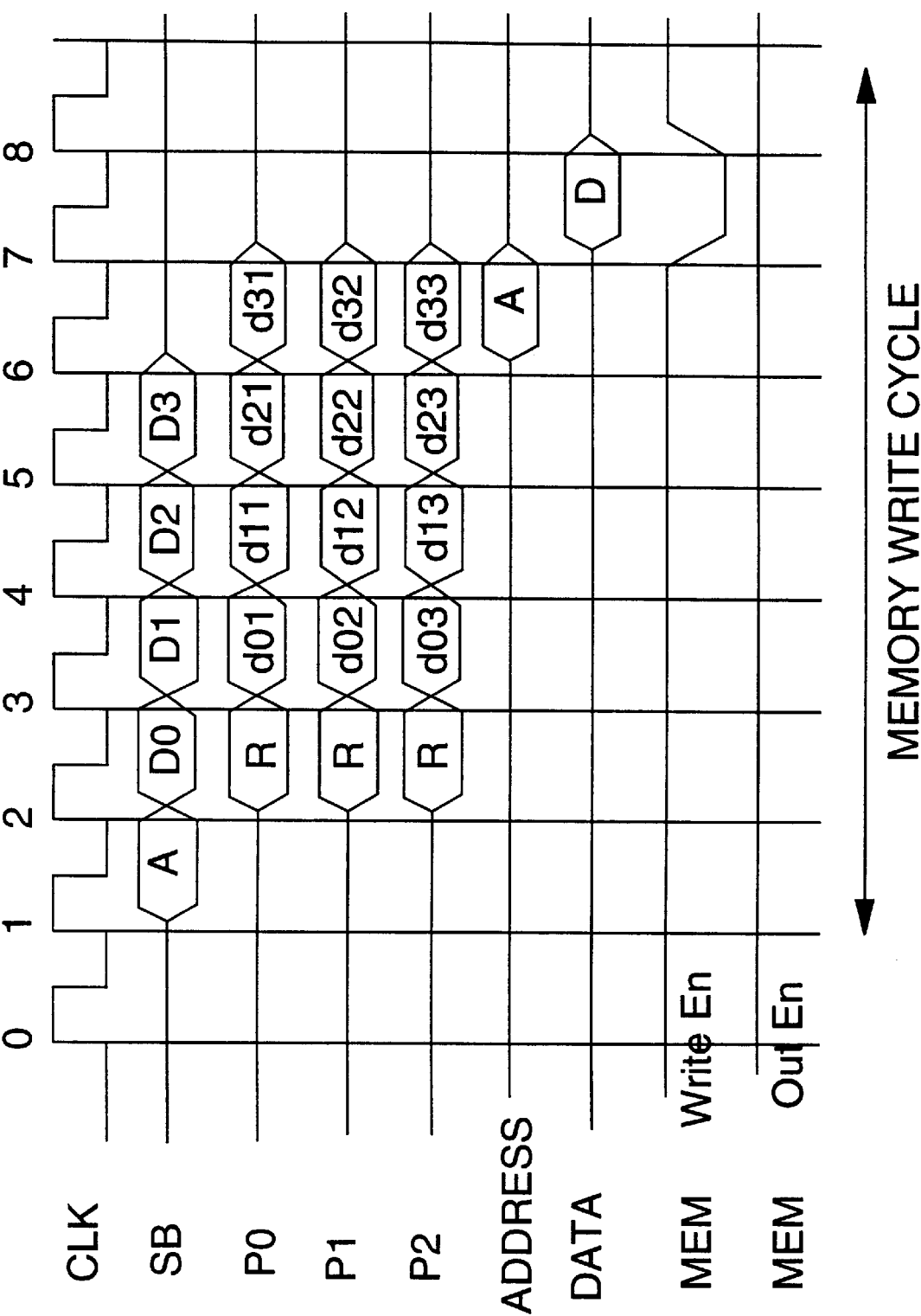
FIG. 28 is a timing diagram which illustrates the timing of data and control signals in connection with a read operation for the four MIU system of FIG. 24.

FIG. 28 is a timing diagram which illustrates the timing of data and control signals in connection with the memory write operation of FIG. 27 for the four MIU system 160 of FIG. 24. During clock cycles 1–2, an address is received from the segment bus. During clock cycles 2–3, data word DO is received from the segment bus, and the Rq signals are sent over the p0, p1 and p2 interconnects to MIUs 164, 166 and 168. During clock cycles 3–4, data word D1 is received from the segment bus, and burst subset fragments d01, d02 and d03 are transferred to MIUs 164, 166 and 168 over the multibit master interconnects of ports p0, p1 and p2 respectively. During clock cycles 4–5, data word D2 is received from the segment bus, and burst subset fragments d11, d12 and d13 are transferred to MIUs 164, 166 and 168 over the multibit master interconnects of arts p0, p1 and p2 respectively. During clock cycles 5–6, data word D3 is received from the segment bus, and burst subset fragments d21, d22 and d23 are transferred to MIUs 164, 166 and 168 over the multibit master interconnects of ports p0, p1 and p2 respectively. During clock cycles 6–7, burst subset fragments d31, d32 and d33 are transferred to MIUs 164, 166 and 168 over the multibit master interconnects of ports p0, p1 and p2 respectively. Also, during clock cycles 6–7, a memory address in registers 206, 208, 210 and 212 is presented to each of the digital memories 170, 172, 174 and 176. During clock cycles 7–8, a memory write enable signal is asserted simultaneously by the control units associated with each of the MIUs and entire data burst subsets stored in the transfer buffers 186, 188, 190 and 192 are written in parallel to the respective digital memories 170, 172, 174 and 176.

Figure 29:
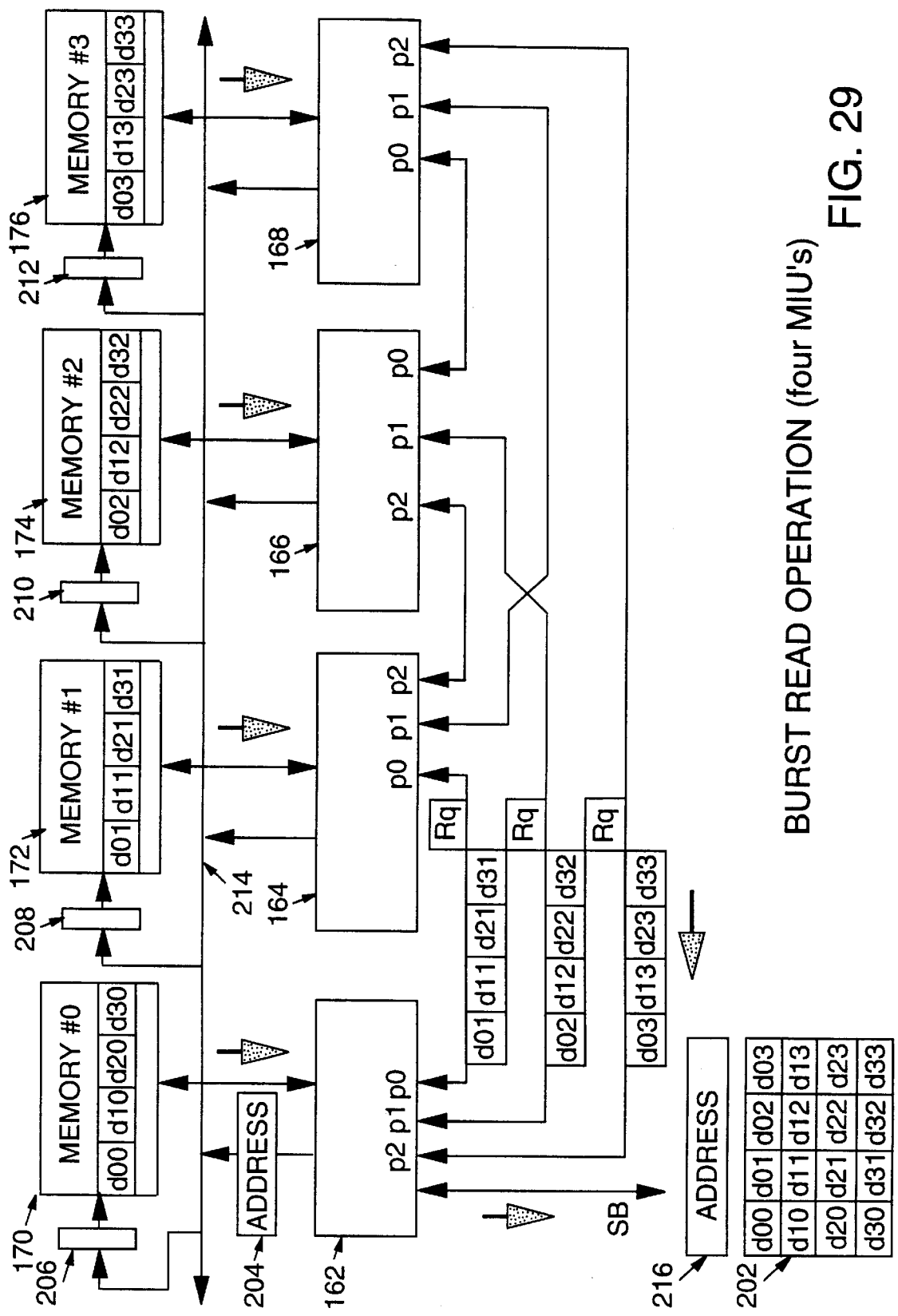
FIG. 29 is a simplified block diagram illustrating the flow of burst subsets within the four MIU system of FIG. 24 during a memory write operation.

FIG. 29 illustrates the flow of burst subsets through the four MIU system 160 of FIG. 24 during a representative memory read operation. Initially, the four words of a burst are distributed across four different digital memories 170, 172, 174 and 176. A memory address 216 is provided to MIU address buffer 204 which presents the address via the connection 214 to memory address registers 206, 208, 210 and 212. Digital memory 170 provides the burst subset d00, d10, d20 and d30 to MIU 162 and then transfers it directly to its bus interface logic (not shown). Digital memory 172 provides the burst subset d01, d11, d21 and d31 to MIU 164 which transfers it to MIU 162 via port p0 interconnects. MIU 162 then transfers the subset to its bus interface logic. Digital memory 174 transfers burst subset d02, d2, d22 and d32 to MIU 166 which transfers it to MIU 162 via port p1 interconnects. MIU 162 then transfers the subset to its bus interface logic. Digital memory 176 transfers burst subset d03, d13, d23 and d33 to MIU 168 which then transfers it to MIU 162 via port p2 interconnects. MIU 162 then transfers the subset to its bus interface logic. Thus, the burst 202 is retrieved from different memories and is made available at the bus interface logic of MIU 162.

Figure 30:
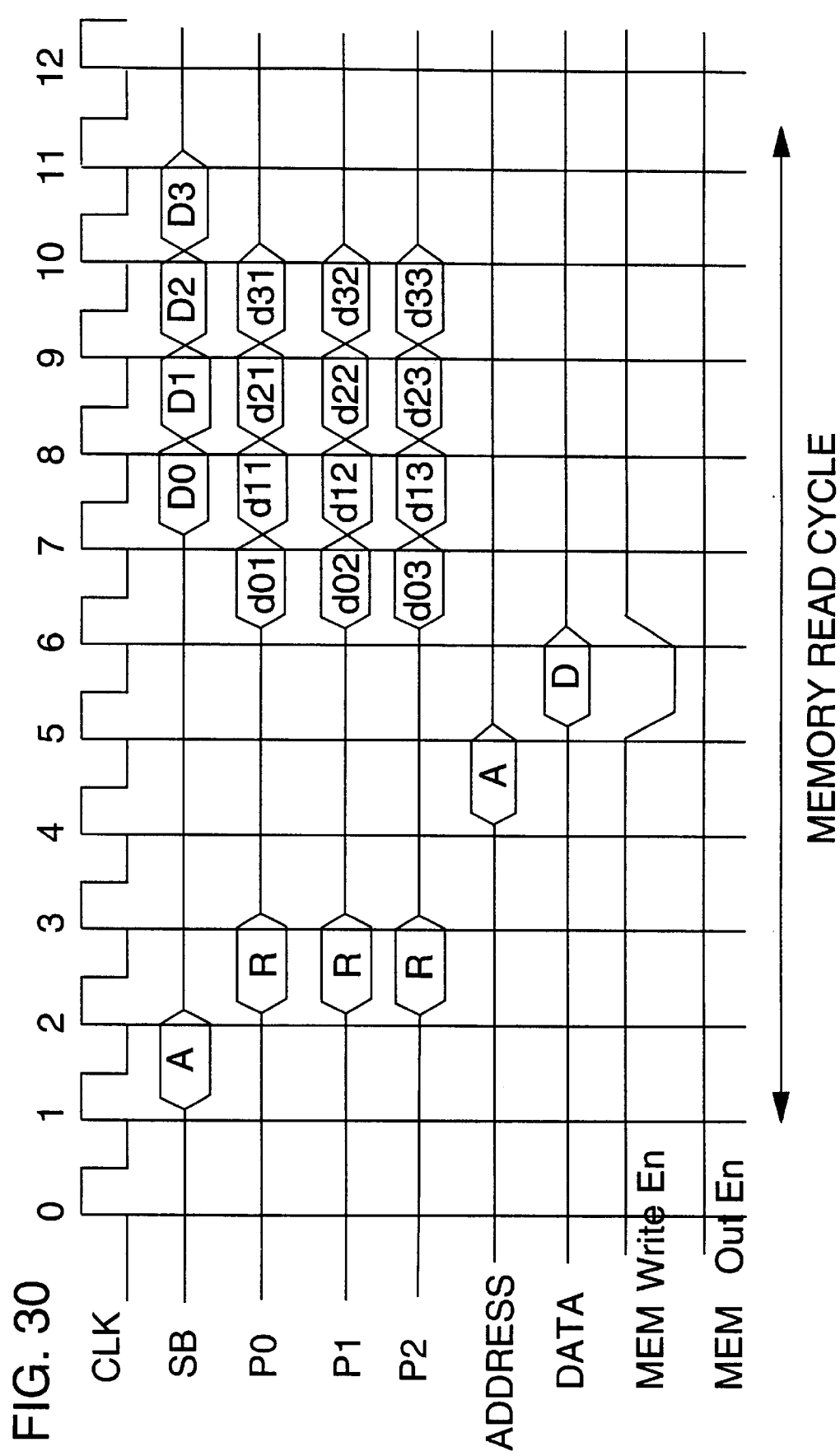
FIG. 30 is a timing diagram which illustrates the timing of data and control signals in connection with a write operation for the four MIU system of FIG. 24.
Figure 31:
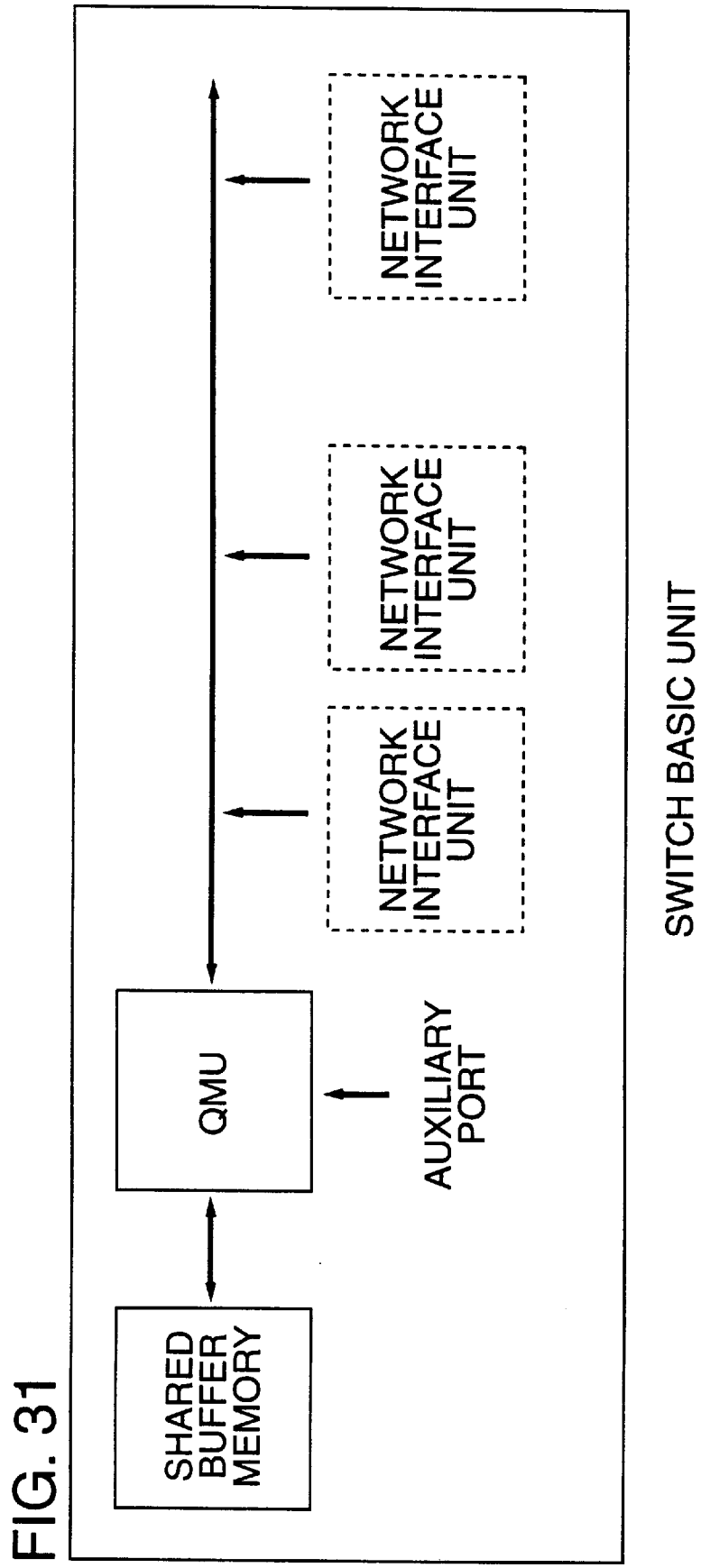
FIG. 31 illustrates a stand alone MIU application using the embodiment of FIG. 11.
Figure 32:
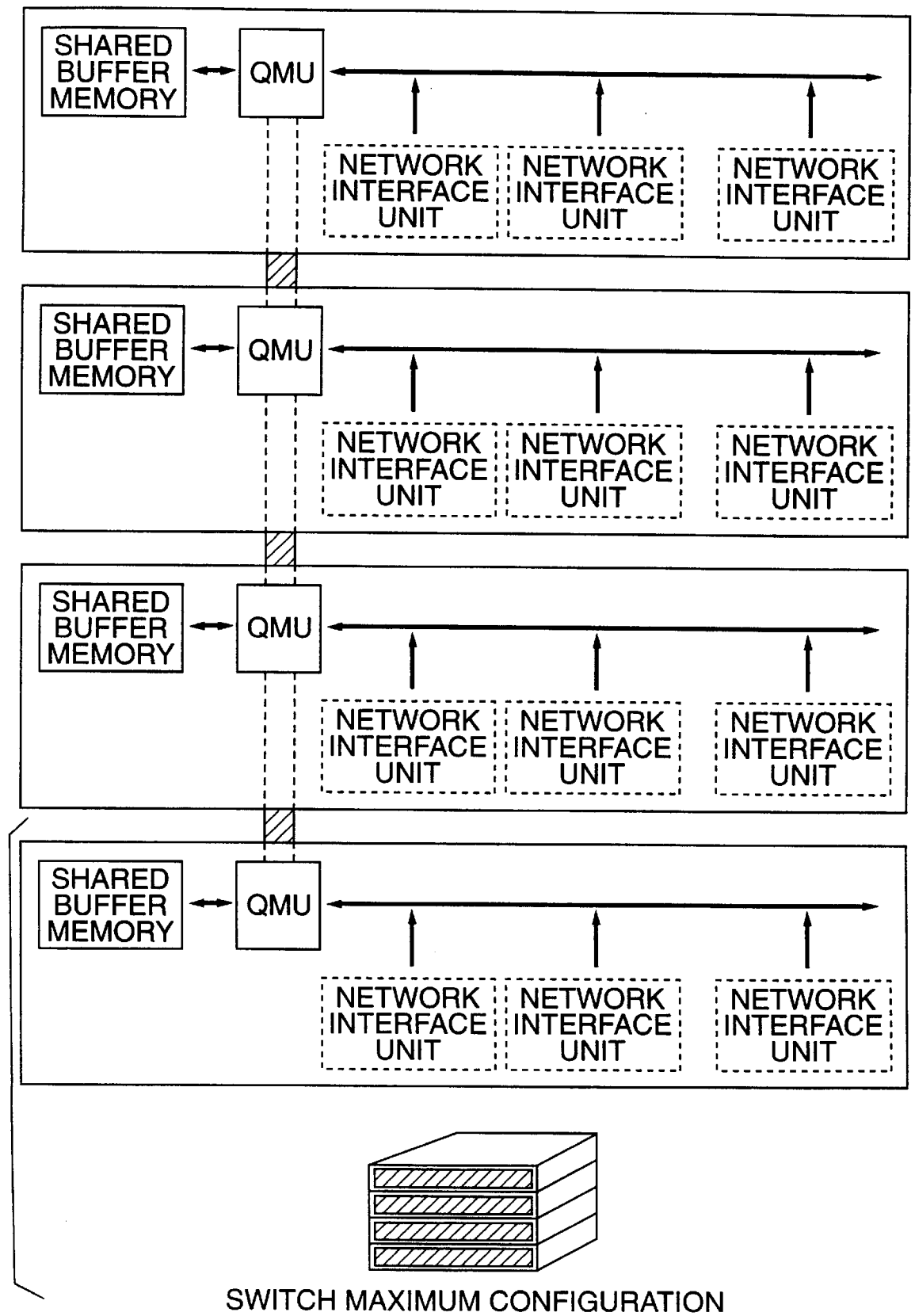
FIG. 32 illustrates a four MIU application using the embodiment of FIG. 11.
Figure 33:
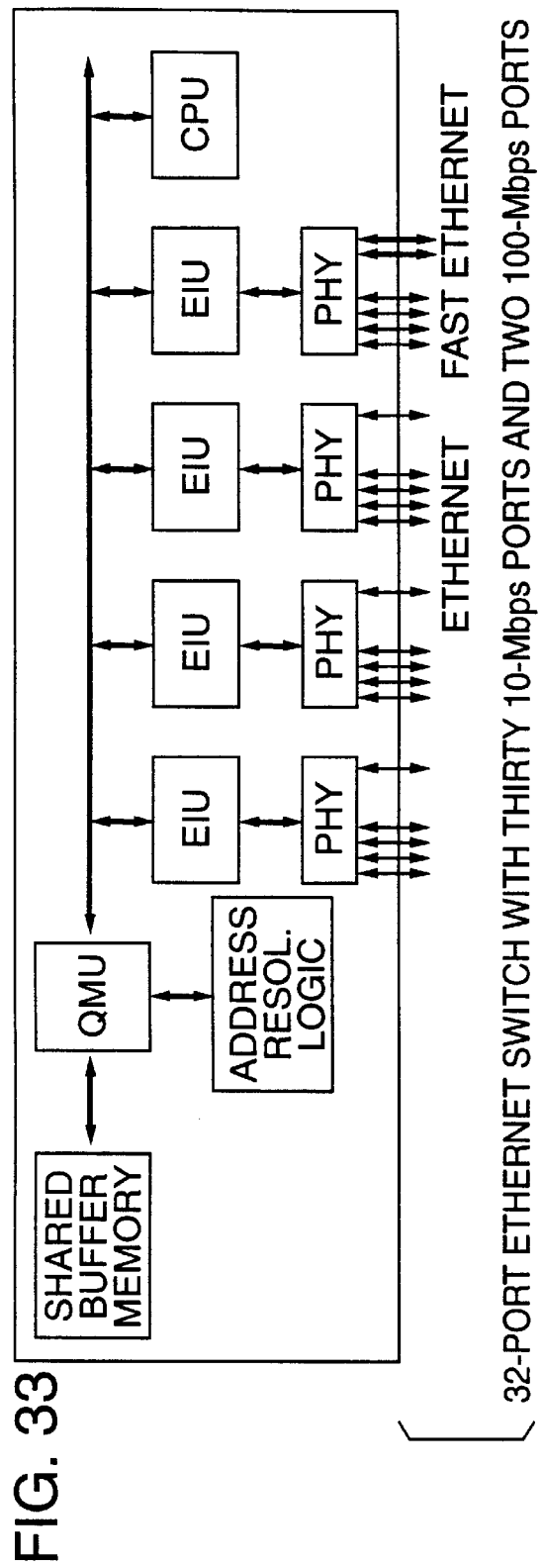
FIG. 33 illustrates an Ethernet switch application using the embodiment of FIG. 11.
Figure 34:
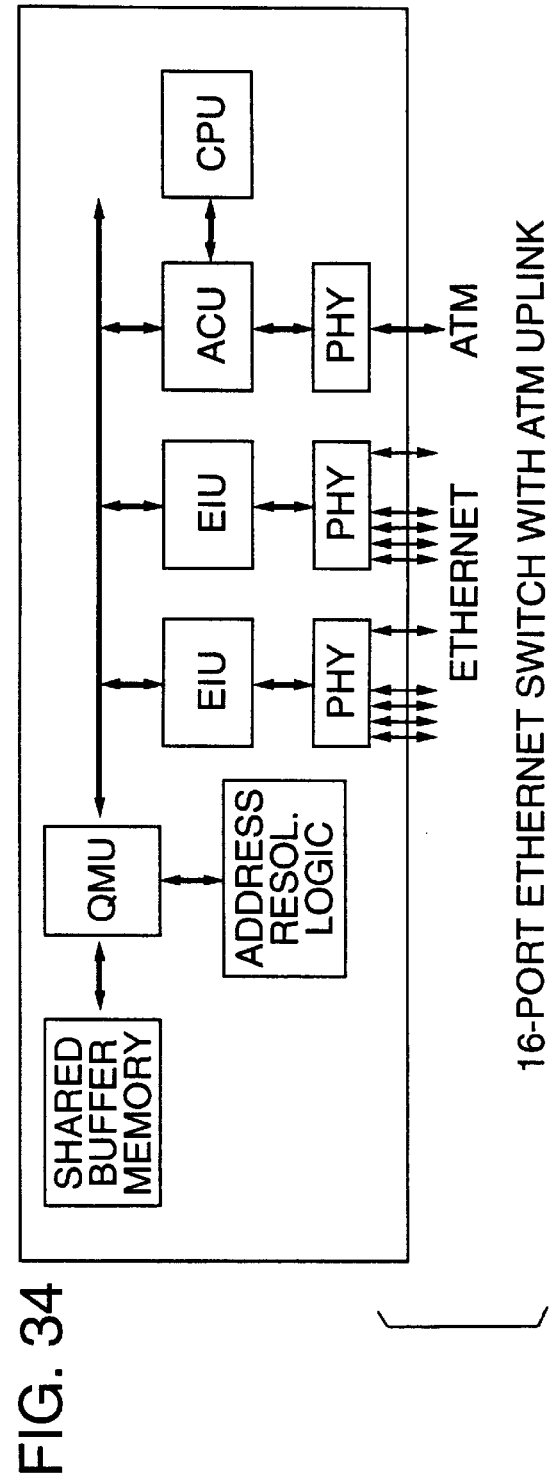
FIG. 34 illustrates an Ethernet switch with ATM uplink application using the embodiment of FIG. 11.
Figure 35:
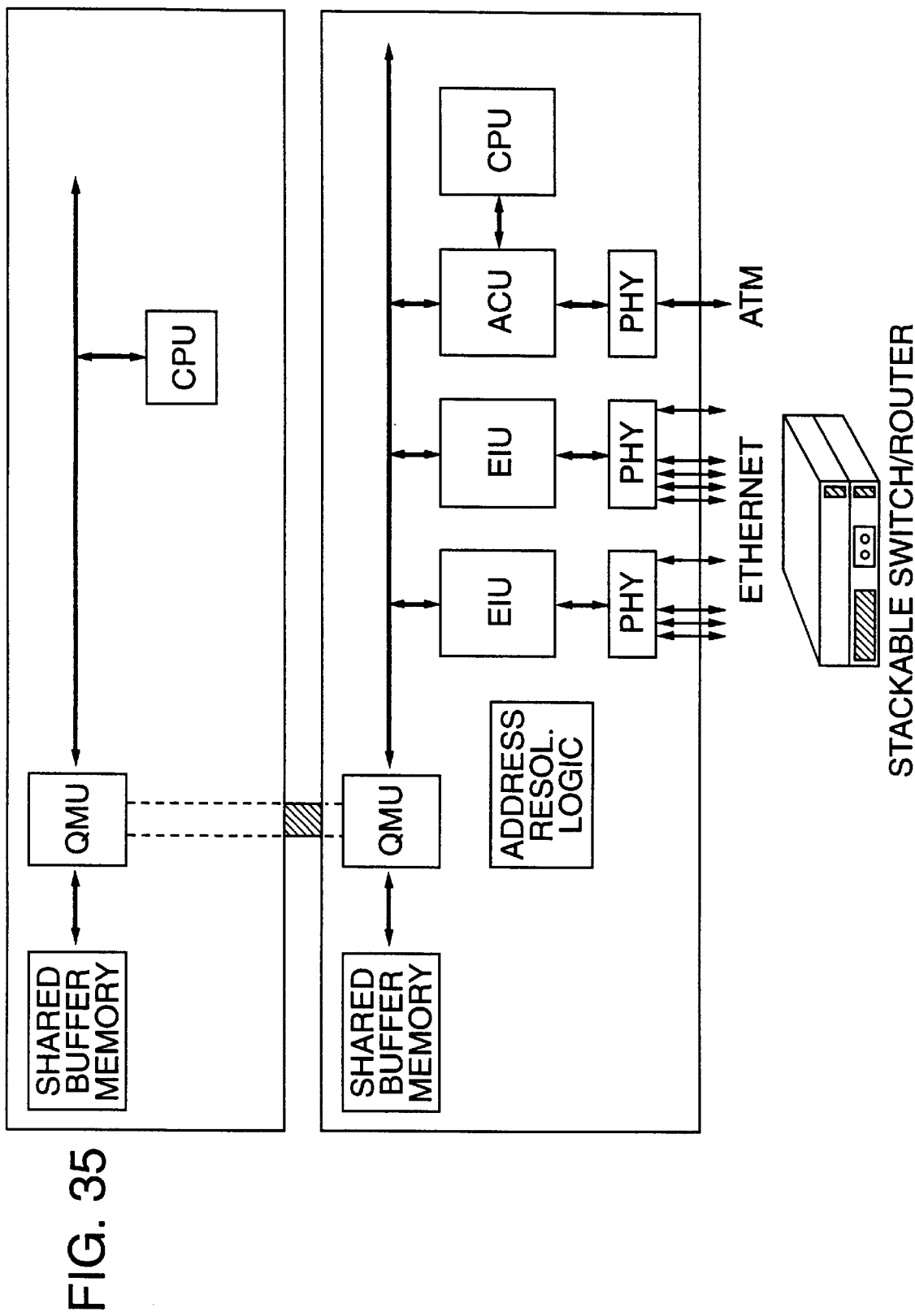
FIG. 35 illustrates a two MIU stackable switch/router using the embodiment of FIG. 11.
Figure 36:
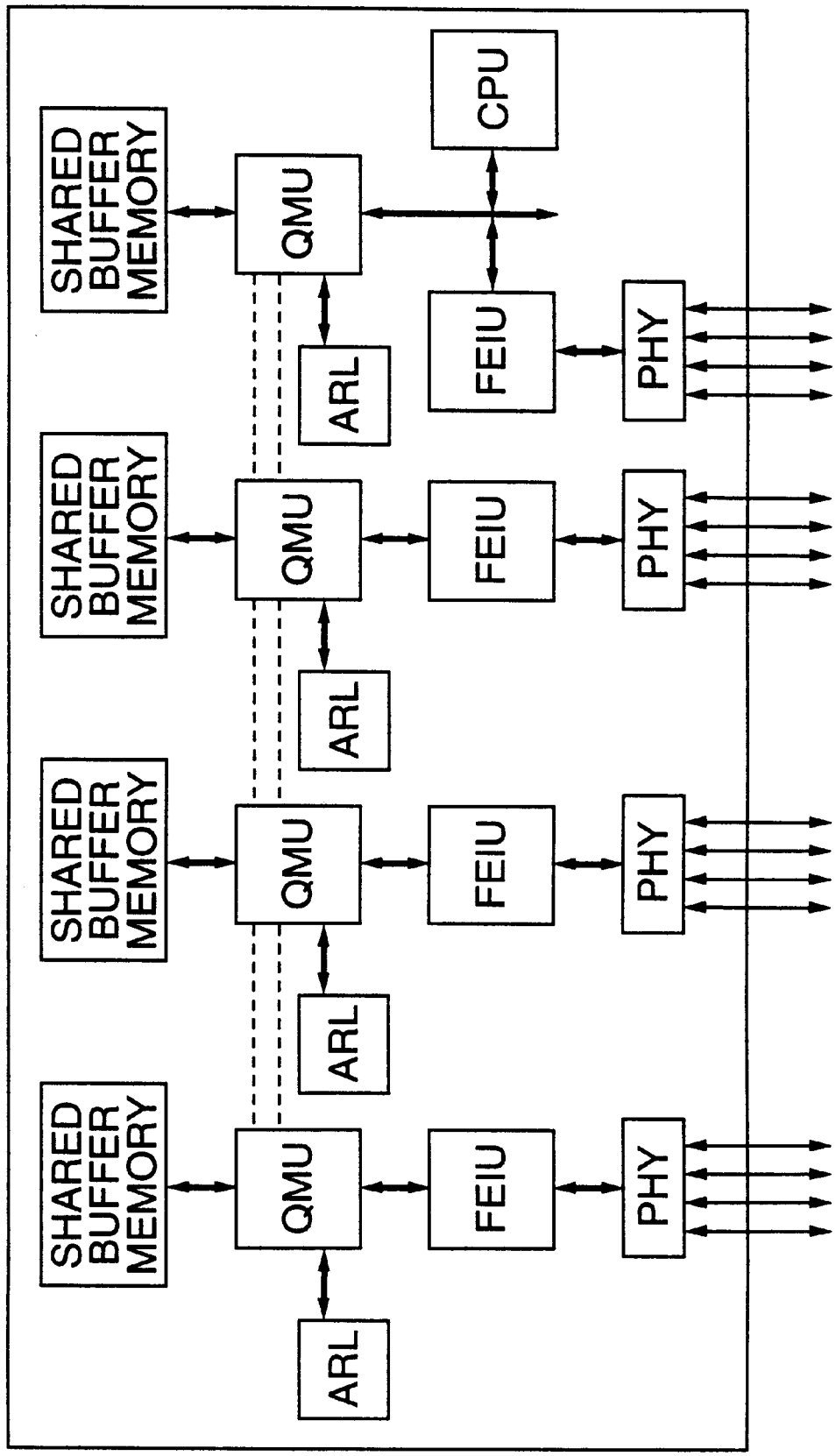
FIG. 36 illustrates a four MIU fast Ethernet switch using the embodiment of FIG. 11.

FIG. 30 is a timing diagram which illustrates the timing of data and control signals in connection with the memory read operation of FIG. 29 for the four MIU system 160 of FIG. 24. During clock cycles 1–2, an address signal is received from the segment bus. During clock cycles 2–3, Rq signals produced by the bus interface logic are sent over the p0, p1 and p2 interconnects of MIU 162. During clock cycles 4–5, a memory address in each of memory address registers 206, 208, 210 and 212 is presented to memories 170, 172, 174 and 176. During clock cycles 5–6, a memory output enable signal is provided to each of the memories, and entire data burst subsets are read in parallel from each of the four memories 170, 172, 174 and 176 and are presented to transfer buffers 186, 188, 190 and 192 for temporary storage. During clock cycles 6–7 byte-wide fragments d01, d02 and d03 are transferred to MIU 162 over the slave interconnects of ports p0, p1 and p2 respectively. During clock cycles 7–8, fragments d11, d12 and d13 are transferred to MIU 162 over the slave interconnects of ports p0, p1 and p2 respectively, and data word DO is presented to the segment bus. During clock cycles 8–9, fragments d21, d22 and d23 are transferred to MIU 162 over the slave interconnects of ports p0, p1 and p2 respectively, and data word Dl is presented to the segment bus. During clock cycles 9–10, fragments d31, d32 and d33 are transferred to MIU 162 over the slave interconnects of ports p0, p1 and p2 respectively, and data word D2 is presented to the segment bus. During clock cycles 10–11, data word D3 is presented to the segment bus. The illustrative drawings of FIGS. 31–36 illustrate some possible applications of the present invention. In these Figures switch system 98 is referred to as a Queue Management Unit ("QMU") in implementing shared memory. FIG. 31 shows the use of a basic switch in a stand alone configuration. FIG. 32 illustrates a four MIU (four QMU) stacked configuration. FIG. 33 illustrates an Ethernet switch implementation. FIG. 34 illustrates an Ethernet switch with ATM uplink. FIG. 35 illustrates a two MIU (two QMU) stackable switcwrouter. FIG. 36 illustrates a four MIU (four QMU) fast Ethernet switch with address resolution (ARL).

Figure 37:
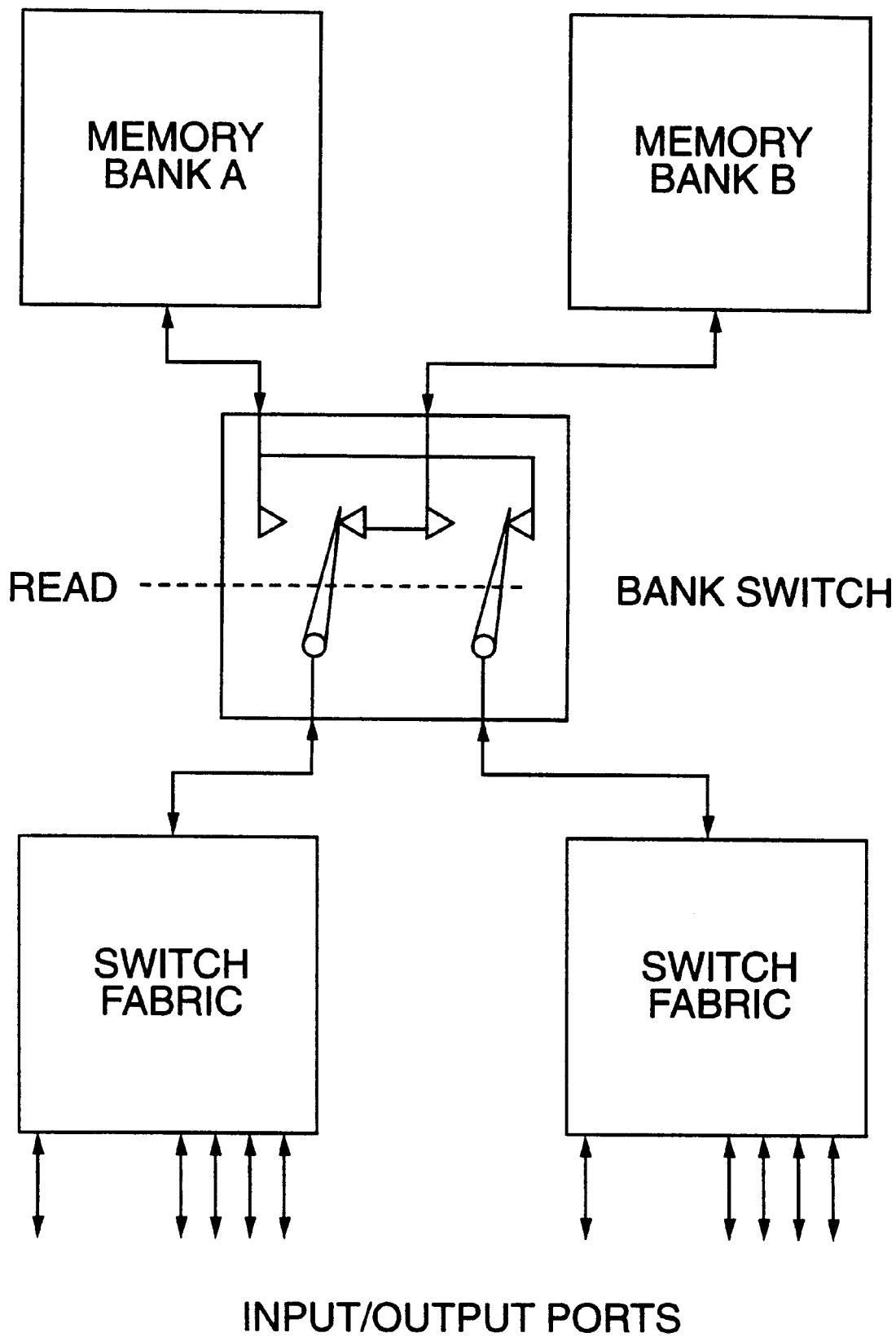
FIG. 37 is an improved embodiment of the switch of FIG. 4, which employs time division multiplex (TDM) switching.
Figure 38:
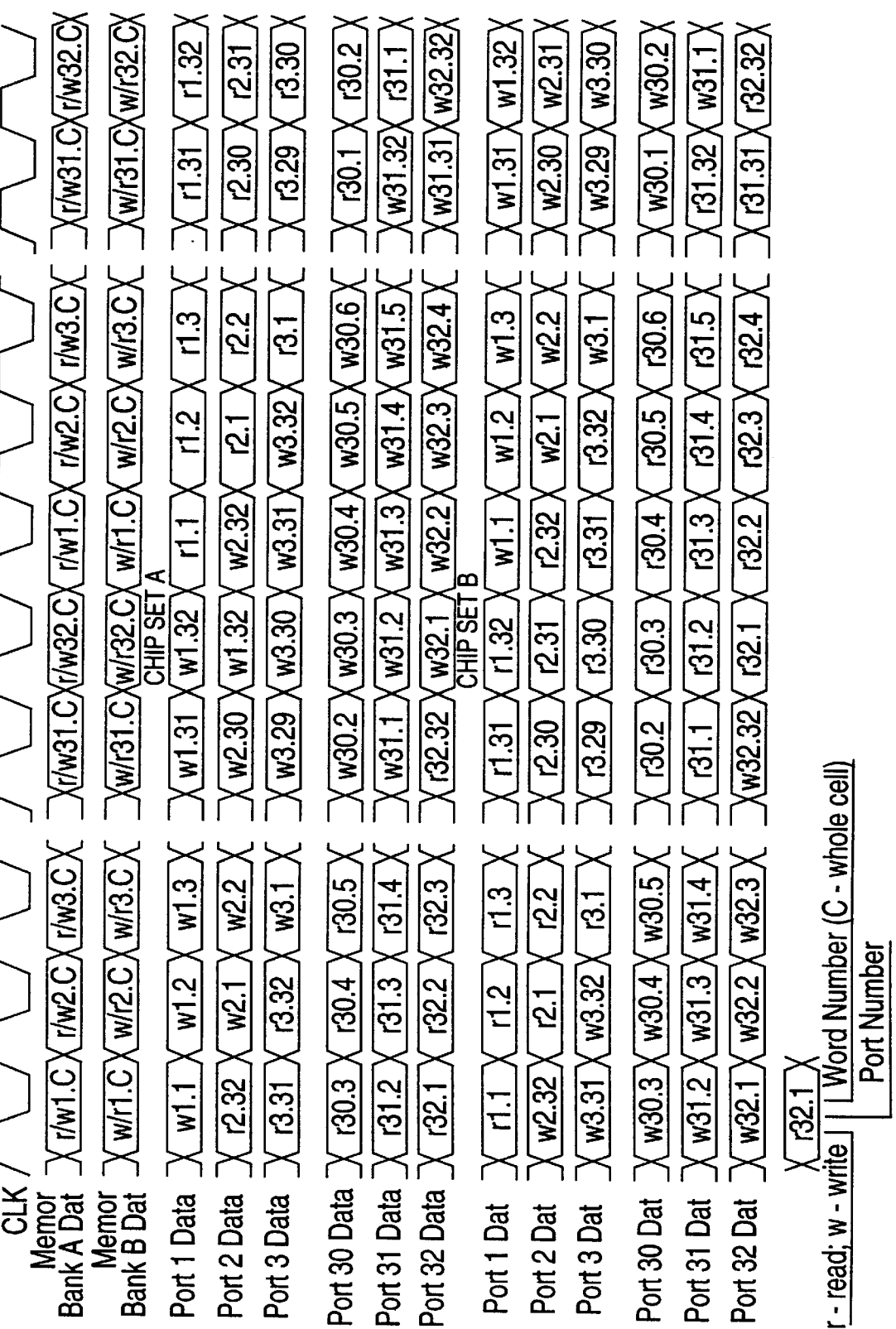
FIG. 38 is a timing diagram illustrating the operation of the switch of FIG. 37.

An improved apparatus is illustrated in FIG. 37 which combines two shared memory switches to result in a non-blocking larger switch with twice the bandwidth (e.g., combine two 32×32 155-Mbps port ATM switches to construct a non-blocking 64×64 155-Mbps port ATM switch, for example). A present embodiment involves a 32×32 ATM switch. In accordance with the improvement, the 32×32 ATM switch operates in a time division multiplex (TDM) fashion. Referring to the timing of the diagram of FIG. 38, the switch cycles in 68-clock periods, divided into 32-clock input stage and 32-clock output stage (and a 4-clock gap). Take two 32×32 switch chipsets and two banks of shared memory. Make each 32×32 chipset be able to access any of the two banks. Operate them in a phase difference so that when one chipset is in the input stage the other is in the output stage. Now, when the one chipset that is in the output stage fetches the cell to be transmitted from the bank that the cell resides in, the other chipset that is in the input stage selects the other bank to write the incoming cell into.

Figure 39:
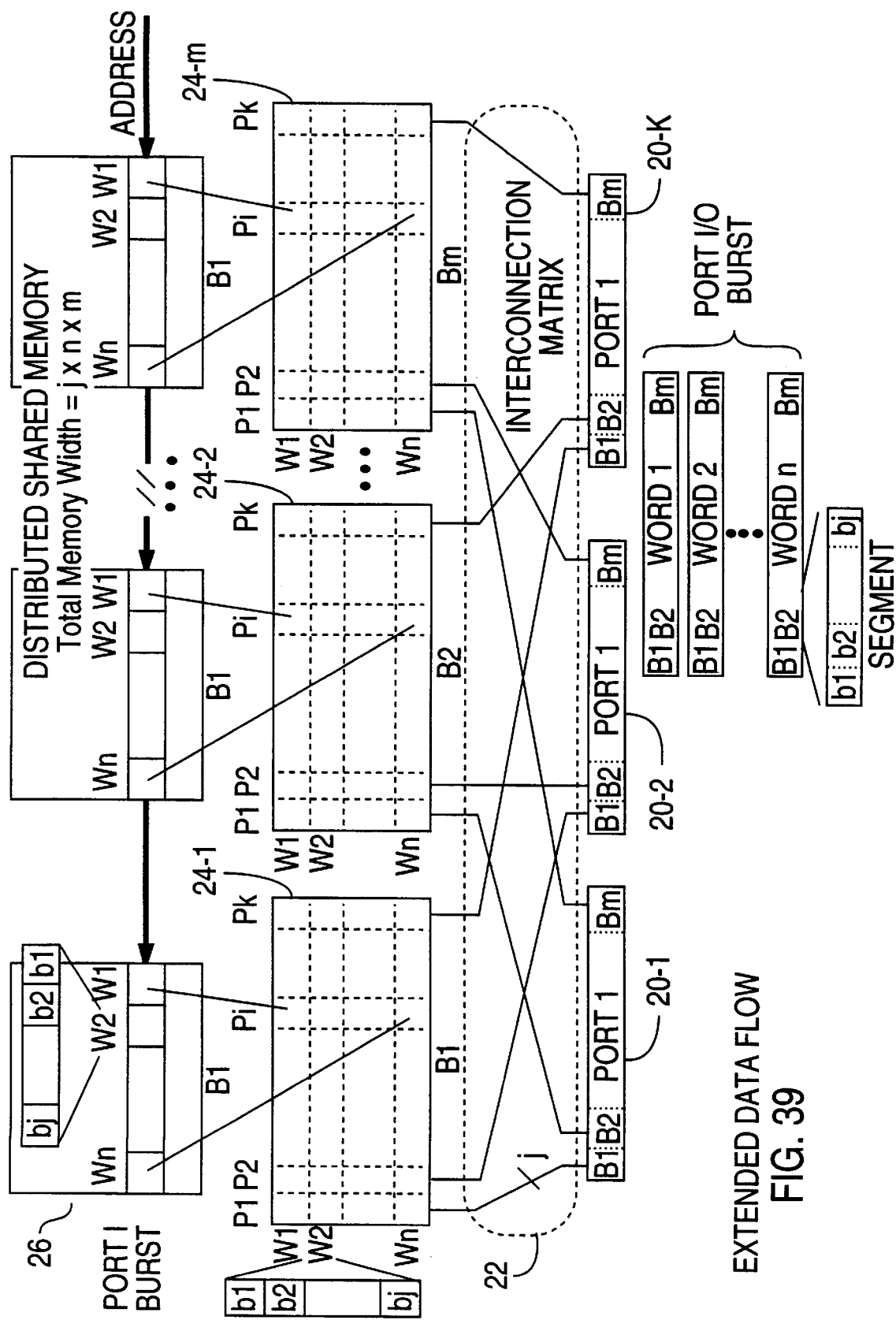
FIG. 39 is an illustrative drawing of an embodiment of the switch of FIG. 4 in which individual byte subsets may be transmitted through a switch matrix multiple bits at a time.

The illustrative drawing of FIG. 39 is provided to make clear that matrix interconnect lines between a port and a buffer may be multiple bits wide for each burst segment. Hence multiple bits per burst segment may be transferred per clock cycle.

While particular embodiments of the invention have been described in detail herein, it will be appreciated that various modifications can be made to the preferred embodiment without departing from the scope of the invention. Thus, the foregoing description is not intended to limit the invention which is defined in the appended claims.

What is claimed is:

1. For use in a multi-port memory system which includes random access memory (RAM) and multiple data ports, a memory interface comprising:

multiple buffers, each including multiple storage elements for simultaneous storage of multiple respective data burst subsets transmitted between different respective data ports and said RAM; and an interconnect circuit which includes a multiplicity of data lines which interconnect each respective data port with multiple respective buffers such that different respective subsets of any given data burst transmitted between a respective data port and said RAM are conducted to or from different respective buffers via different respective data lines, wherein at least one data line interconnecting a port and a buffer is multiple bits wide.

2. The system of claim 1 wherein each buffer includes parallel data path circuitry connectable between individual storage elements and said RAM.

3. The system of claim 2 wherein respective storage elements include transfer circuitry which transfers data burst subsets to and from said interconnect circuit so that each subset is transferred in groups of two or more, but less than all, bits at a time.

4. The system of claim 2 wherein respective storage elements include respective shift-in register circuitry for shifting in respective data burst subsets from said interconnect circuit so that each data burst subset is shifted in in groups of two or more, but less than all, bits at a time, and include respective shift-out register circuitry for shifting out respective data burst subsets to said interconnect circuit so that each data burst subset is shifted out in groups of two or more, but less than all, bits at a time.

5. The system of claim 2 wherein respective storage elements include respective shift-in/parallel shift-out register circuitry for shifting in respective data burst subsets from said interconnect circuit so that each data burst subset is shifted in in groups of two or more, but less than all, bits at a time, and for parallel shift out of such data burst subsets to said RAM; and wherein respective storage elements further include respective parallel shift-in/shift-out register circuitry for parallel shift in of respective data burst subsets from said RAM and for shifting out such data burst subsets to said interconnect circuit so that each data burst subset is shifted out in groups of two or more, but less than all, bits at a time.

6. The system of claim 5, wherein respective parallel data path circuitry intermittently connects respective shift-in/parallel shift-out register circuitry with said RAM; and wherein respective parallel data path circuitry intermittently connects respective parallel shift-in/shift-out register circuitry with said RAM.

7. The system of claim 1 wherein said interconnect circuit includes a printed circuit board.

8. The system of claim 2 in combination with the random access memory (RAM) and the data ports.

9. The system of claim 8, including a single RAM integrated circuit.

10. The system of claim 8 and further including:

control circuitry which provides control signals that control simultaneous parallel transfer of all subsets of any given data burst between said RAM and multiple different buffers storing different subsets of such given data burst.

11. The system of claim 8 wherein said respective storage elements include transfer circuitry which transfers data burst subsets to and from said interconnect circuit so that each data burst subset is transferred in groups of two or more bits at a time; and further including:

control circuitry which provides control signals that control simultaneous parallel transfer of all subsets of any given data burst between said RAM and multiple different buffers storing different subsets of such given data burst and which provides control signals that control transfer of data burst subsets between said interconnect circuitry and different respective buffers.

12. The system of claim 8 comprising k of said data ports and m of said buffers, each buffer including k of said storage elements for simultaneous storage of multiple respective subsets of n-word data bursts transmitted between different respective data ports and said RAM, each buffer further including parallel data path circuitry connectable between individual storage elements and said RAM;

wherein each respective subset consists of more than n respective bits that occupy the same respective bit positions in different respective data words of a respective n-word data burst; and wherein the interconnect circuit data lines interconnect each respective data port with m different buffers such that the m different respective subsets of any given n-word data burst transmitted between a respective data port and said RAM are conducted to or from m different respective buffers.

13. A method for transferring n-word data bursts that include m bits per word between k data ports and random access memory (RAM) comprising the steps of:

partitioning data bursts transferred through respective data ports into respective data burst subsets in which each respective subset includes more than n respective bits wherein such more than n respective bits occupy the same respective bit positions in different data words of a respective data burst;

providing m buffers, each including k storage elements;

temporarily storing different data burst subsets of a respective data burst in transit to or from any respective data port and the RAM in different storage elements within different buffers; and transferring all of the different data burst subsets of a respective data burst in transit to or from any respective data port and the RAM in parallel between different storage elements in different buffers and the RAM.

14. The method of claim 13 further including the step of:

transferring, multiple bits at a time but less than all bits at a time, each respective data burst subset of a respective data burst transmitted to or from a respective data port and the RAM between such respective data port and different storage elements in different buffers.

15. A multi-port memory system comprising:

random access memory (RAM);

k data ports;

means for partitioning data bursts transferred through respective data ports into respective data burst subsets in which each respective subset includes more than n respective bits wherein such more than n respective bits occupy the same respective bit positions in different data words of a respective n-word data burst;

m buffers means, each including k storage element means for temporarily storing different data burst subsets of a respective data burst in transit to or from any respective data port and the RAM in different storage element means within different buffer means; and means for transferring all of the different data burst subsets of a respective data burst in transit to or from any respective data port and the RAM in parallel between different storage element means in different buffer means and the RAM.

16. A memory system comprising:

a plurality of buffers for temporary storage of data, each buffer comprising storage for storing portions of different data words but not an entire data word;

a memory;

for each buffer, a parallel bus interconnecting the buffer and the memory, the parallel bus width being less than the number of bits that can be stored in the buffer at any given time; and a control circuit for transferring data between all the buffers and the memory in parallel so that portions of the same data words are transferred in parallel between the buffers and the memory, so that a plurality of whole words are transferred between the buffer and the memory in parallel, wherein each buffer comprises a plurality of terminals, the terminals of each buffer being subdivided into sets having a plurality of terminals each, wherein each set of terminals is to transfer a portion of a data word in one clock cycle.

17. The memory system of claim 16 wherein data are to be transferred from the buffers to the memory.

18. The memory system of claim 16 wherein data are to be transferred from the memory to the buffers.

19. An interface buffer comprising:

a plurality of storage elements;

a plurality of terminals for carrying data to be shifted into and out of the storage elements;

a parallel bus for parallel transfer of all the data stored in any single one of the storage elements to a memory and for parallel transfer of data from the memory into any one of the storage elements; and circuitry for controlling the storage elements so that:
(1) multiple bits of data are shifted from each of the terminals into a respective storage element simultaneously with data being written from the parallel bus to the storage elements, and
(2) multiple bits of data shifted out to each of the terminals from a respective storage element simultaneously with data being read from the storage elements to the parallel bus,
wherein the buffer is operable to transfer j bits of data between each of the storage elements and the terminals per clock cycle, where j>1.

20. The buffer of claim 19 wherein the storage elements comprise, for each terminal, a first shift register to store data shifted in from the terminal, and the second shift register to store data to be shifted out to the terminal, and wherein the width of the parallel bus is at least as large as the number of bits that can be stored in any one of the first and second shift registers at any given time, but the width of the parallel bus is less than the combined width of all the first registers or the combined width of all the second registers.

21. An interconnect matrix comprising:

a plurality of groups of first terminals, each group of first terminals being for connection to a buffer;

a plurality of groups of second terminals, each group of second terminals for connection to a network port circuit; and interconnections each of which connects a single one of the first terminals to a single one of the second terminals to connect each port circuit to all the buffers and each buffer to all the port circuits, wherein each group of first terminals and each group of second terminals are interconnected by a plurality of said interconnects.

* * * * *